(12) United States Patent
Brauer

(10) Patent No.: US 10,233,056 B1
(45) Date of Patent: Mar. 19, 2019

(54) GRASPING APPARATUS AND METHODS FOR TRANSPORTING ROLLING RACKS

(71) Applicant: Jeffery L. Brauer, Gallatin, TN (US)

(72) Inventor: Jeffery L. Brauer, Gallatin, TN (US)

( * ) Notice: Subject to any disclaimer, the term of this patent is extended or adjusted under 35 U.S.C. 154(b) by 0 days.

(21) Appl. No.: 15/229,377

(22) Filed: Aug. 5, 2016

Related U.S. Application Data

(60) Provisional application No. 62/201,448, filed on Aug. 5, 2015.

(51) Int. Cl.
*B66C 3/06* (2006.01)
*B66F 9/18* (2006.01)

(52) U.S. Cl.
CPC . *B66C 3/06* (2013.01); *B66F 9/18* (2013.01)

(58) Field of Classification Search
CPC .......... B66C 3/06; B66F 9/18; B66F 9/07504; B62B 3/04
USPC ............... 414/619, 621, 461, 450, 453, 785; 280/400, 402; 180/19.1, 19.2, 19.3, 904
See application file for complete search history.

(56) References Cited

U.S. PATENT DOCUMENTS

| | | | | |
|---|---|---|---|---|
| 4,287,966 A | * | 9/1981 | Frees | B66F 9/07504 180/14.1 |
| 4,884,936 A | * | 12/1989 | Kawada | B62B 3/04 280/43.12 |
| 5,439,069 A | * | 8/1995 | Beeler | B62B 3/1404 180/11 |
| 5,573,078 A | * | 11/1996 | Stringer | B60K 1/00 180/11 |
| 6,070,679 A | * | 6/2000 | Berg | B62B 3/1404 180/19.2 |
| 7,448,842 B2 | * | 11/2008 | Schonauer | B66F 9/18 410/80 |
| 7,549,651 B2 | * | 6/2009 | Holtan | B62B 3/1404 180/19.1 |
| 7,712,558 B2 | * | 5/2010 | Helson | B62B 5/0079 180/19.1 |
| 7,878,277 B2 | * | 2/2011 | Turner | B60S 13/00 180/19.2 |
| 2004/0245030 A1 | * | 12/2004 | Holtan | B62B 3/1404 180/19.1 |

* cited by examiner

*Primary Examiner* — Kaitlin S Joerger
(74) *Attorney, Agent, or Firm* — Bradley Arant Boult Cummings, LLP; Phillip E. Walker; Timothy L. Capria

(57) ABSTRACT

A grasping apparatus for transporting one or more rolling racks. A transfer device can be used in connection with the grasping device. The grasping apparatus can include a collection area and controls. The collection area preferably extends from the transport device in a direction away from the user of the transport device. The controls are preferably located in an area accessible by a user of the transport device when using the transport device to transfer rolling racks. The collection area can include one or more extensions or armatures designed to grasp a portion of the rolling rack and secure that portion of the rolling rack for transport of that rolling rack as dictated by movement of the transfer device by the user. The controls of the grasping apparatus allow a user to removeably engage the collection area.

10 Claims, 30 Drawing Sheets

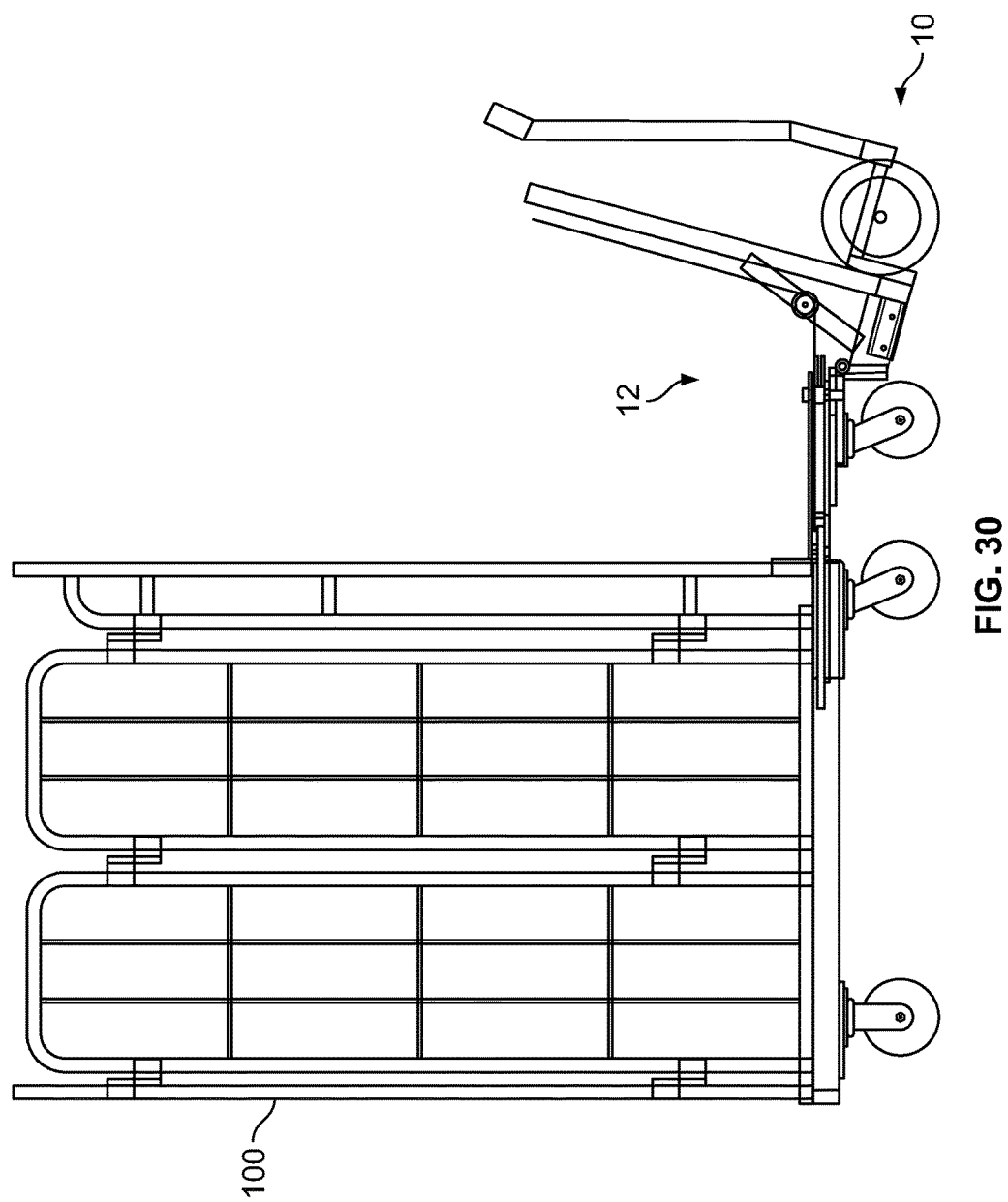

GRASPING APPARATUS AND METHODS FOR TRANSPORTING ROLLING RACKS

This is a non-provisional patent application claiming priority to U.S. Provisional Patent Application Ser. No. 62/201,488 filed Aug. 5, 2015 and entitled "Grasping Device".

This non-provisional patent application is filed by applicant Jeffery L Brauer, a citizen of the United States, residing in Gallatin Tennessee for the invention of a "Grasping Apparatus and Methods for Transporting Rolling Racks".

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

BACKGROUND

Technical Field

The present disclosure relates to material handling systems and more particularly to devices and methods for transporting rolling racks in association with a transport device.

Background Art

Transport devices for moving materials are known in the art. The transport devices can be manual or motorized. Examples of such transport devices include lift trucks, hand trucks, pallet trucks, pallet jacks, forklifts, dollies, and the like.

Some of these transport devices include a stationary base having a set width and length. This stationary base is meant to slide under the object being moved in order to lift that object for transportation. Other transport devices generally include a moveable base having one or more arms extending outwardly from the base. The arms are vertically moveable for lifting and lowering materials. When the arms are in a raised position, the base may be moved by an operator either manually or using a motor, thereby transporting material that is supported by the arms.

One problem associated with conventional transport devices forklifts, pallet jacks and pallet trucks is encountered when trying to transport rolling racks. Rolling racks generally include racks or shelves that have roller-type wheels on the bottom. The wheels facilitate easier movement of the racks along the floor/ground. In many applications, such as in a warehouse or in a container truck, it is desirable to move multiple rolling racks at once. Such racks may be empty or may be pre-loaded with other types of materials. It is generally inefficient to roll individual rolling racks over great distances.

Some have attempted to load rolling racks on the aforementioned transport devices. The bases of these transport devices, whether stationary or vertically varying, do not facilitate a secured transfer of the rolling racks due to the fact that the roller wheels do not typically stay stationary on those bases, complicating the transport process.

Some have attempted to load rolling racks on pallets or other types of rack holding platforms for transport using transport devices such as forklifts or pallet trucks. However, rolling racks have a tendency to roll off such conventional pallets and platforms, further complicating the transport process.

What is needed then are improvements in the devices and methods for transporting rolling racks using transport devices.

BRIEF SUMMARY

The present disclosure provides devices and methods for transporting rolling racks using grasping apparatus and a transfer device.

In some embodiments, the present disclosure provides a grasping apparatus for transporting one or more rolling racks. A transfer device can be used in connection with the grasping device. The transfer device includes wheels and can be manually powered or be motorized. The grasping apparatus can attach to a portion of the transfer device, such as a frame or housing, and extend therefrom.

The grasping apparatus can include a collection area and controls. The collection area preferably extends from the transport device in a direction away from the user of the transport device. The controls are preferably located in an area accessible by a user of the transport device when using the transport device to transfer rolling racks. The collection area can include one or more extensions or armatures designed to grasp a portion of the rolling rack and secure that portion of the rolling rack for transport of that rolling rack as dictated by movement of the transfer device by the user. The controls of the grasping apparatus allow a user to removeably engage the collection area. Specifically, at least one of the extensions can engage around a portion of the rolling rack in order to pull or push that rolling rack as dictated by the collection area and ultimately the transfer device and user.

In another embodiment, the present disclosure provides a method of transporting rolling racks by a transporting device and a grasping device. The grasping device can have moveable armatures to secure the grasping device to the rolling racks. The method includes activating the armatures to secure at least one of the armatures around a portion of the rolling rack to secure that rolling rack to the grasping apparatus and transporting device. As such, movement of the transporting device will move the grasping apparatus and ultimately the rolling rack as desired by a user.

Numerous other objects, features and advantages of the present disclosure will be readily apparent to those skilled in the art upon a reading of the following description when taken in conjunction with the accompanying drawings.

BRIEF DESCRIPTION OF THE DRAWINGS

FIG. 3 shows an example of armatures engaging a portion of the rolling rack.

FIG. 4 shows the grasping device fully engaged to the rolling rack.

FIG. 5 shows movement of the rolling rack by the transfer device and grasping apparatus as pulled by a user.

In FIG. 14, the armatures are shown in a closed position.

FIG. 16 shows the engagement area pivoting in a first direction.

FIG. 17 shows the engagement area pivoting in a second direction.

FIG. 30 is a side schematic of a grasping apparatus and transfer device made in accordance to the current disclosure and engaging a portion of a rolling rack.

DETAILED DESCRIPTION

Figure 1:
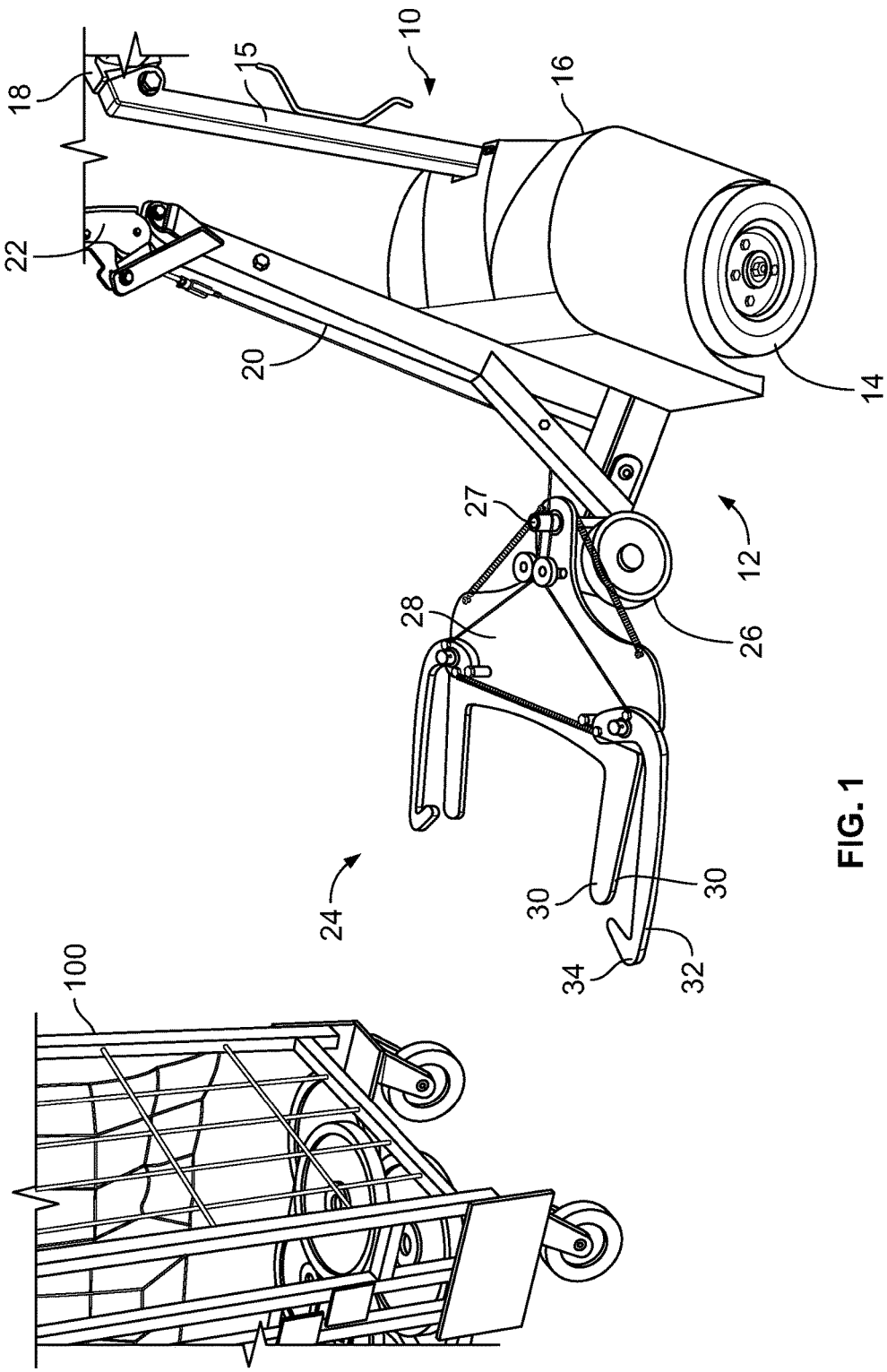
FIG. 1 is a perspective view of an apparatus made in accordance with the current disclosure and used with a transfer device to transport a rolling rack.

Referring generally now to FIGS. 1-30, one embodiment of the present disclosure provides a grasping apparatus generally designated by the numeral 12. It is understood that, for the sake of clarity, not all reference numbers are included in each drawing. In addition, positional terms such as a "upper," "lower," "side," "top," "bottom," "vertical," "horizontal," etc. refer to the apparatus when in the orientation shown in the drawing. The skilled artisan will recognize that objects in accordance with the present disclosure can assume different orientations when in use.

Referring now to FIG. 1, the grasping apparatus 12 can be preferably attached to a transfer device 10. The transfer device 10 can be one of those transfer devices as known in the art, including lift trucks, hand trucks, pallet trucks, pallet jacks, fork lifts, dollies, and the like. The transfer device 10 can be manually powered or can include a motor or engine that aids and/or moves the transfer device and anything attached thereto. A user of the transfer device 10 and grasping apparatus 12 can move those items by manual power or through controls of the transfer device 10 that facilitates movement of the transfer device 10, the grasping apparatus 12, and any rolling racks 100 attached thereto.

In a preferred embodiment the transfer device 10 includes wheels 14 that support a housing 16 and a frame 15 within the housing 16. Controls 18 can be attached to the housing 16 and frame 15 that facilitate movement of the transfer device 10. The transfer device 10 can react to the controls 18, which can manually turn levers and armatures, or can be electronic controls 18 for a motor or engine positioned within the housing 16 or on the frame 15.

The grasping apparatus 12 can include a frame 20 that connects the controls 22 to the engagement area 24. The frame 20, controls 22, and engagement area 24 can be connected to the housing 16 and/or frame of the transfer device 10. The engagement area 24 can be supported by a wheel 26 that can pivot about an axis to allow for control of movement of the engagement area 24.

The engagement area 24 can include a bracket 28, or plate, or support, rotatively connected to the frame 20. The bracket 28 and the wheel 26 can be rotatably connected at the same location or alternate locations as desired. The bracket 28 includes guide armatures 30 and actuating armatures 32. The guide armatures 30 are positioned on the bracket 28 and spaced from one another to removeably engage a rolling rack 100. More specifically the guide armatures 30 can removeably engage a portion of the frame of the rolling rack 100 or a portion of the wheel, castor, rolling device element of the rolling rack 100. This is best illustrated in FIGS. 1-6.

The actuating armatures 32 are attached to the bracket 28 and positioned in a spaced relationship with respect to one another. Additionally the actuating armatures 32 are positioned to create a space between an adjacent guide armature 30. This space is designed to engage a portion of the rolling rack 100 between one of the guide armatures 30 and the associated proximate actuating armature 32. Again, this is best seen in FIGS. 1-6. The actuating armature 32 can further include an engagement end 34 designed to removeably secure the rolling rack 100 between the actuating armature 32 and the proximate guide armature 30. The engagement end 34 maintains the rolling rack 100 within the space 31 created between one of the guide armatures 30 and its associated actuating armature 32.

The controls 22 of the grasping apparatus 12 can be positioned on the frame 20 as desired. In a preferred embodiment, the controls 22 are position proximate to a user of the transfer device 10. This facilitates use of the device 10 and grasping apparatus 12 by the user. The controls 22 can include an actuating device 36, such as a handle, that can operate the movement of the actuating armatures 32 through a series of connections 38. The handle 36 can alternately be a button, lever, switch, or the like and still maintain the inventive concept taught herein. The connectors 38 can be various items as known to actuate elements. The connectors 38 are shown as cables and pulleys, but can also be rods and levers. Further, the connectors 38 can include electrical current carrying devices, such as wires, that activate small electrical devices that can be used to move the actuating armatures 32.

The bracket 28 can also include grasping biasing member 40, such as springs, used to facilitate opposed movement of the actuating arms 32. This grasping biasing member 40 can be used to return the actuating armatures 32 to a closed position once the user activates the actuating device 36. The grasping biasing member 40 also acts as a counter balancing force to the actuating device 30 and the force applied to the actuating arms 32. In automated versions, the biasing member 40 may not be needed.

The bracket 28 can also include bracket, or support, biasing members 42 that facilitate positioning of the bracket 28 about the axis 27. These bracket biasing members 42 help align the engagement area 24 and spaces 31 with the rolling rack 100 to facilitate engagement of the engagement area 24 to the rolling rack 100. This can be described as a "self-aligning" element of the bracket 28. This self-aligning element allows engagement of the bracket 28 to the rolling rack 100 at multiple angles and through approximately a 90 degree span.

The figures show the actuating armatures 32 outside the guide armatures 30. In an alternate embodiment this position can be reversed where the actuating armatures 32 are inside the guide armatures 30. A factor in this positioning is the width of the rolling rack 100 and the arc of the actuating armatures 32. The bracket 28 could be set up such that the actuating armatures 32 rotate inwardly as opposed to outwardly during the disengagement and engagement of the rolling rack 100.

Figure 15:
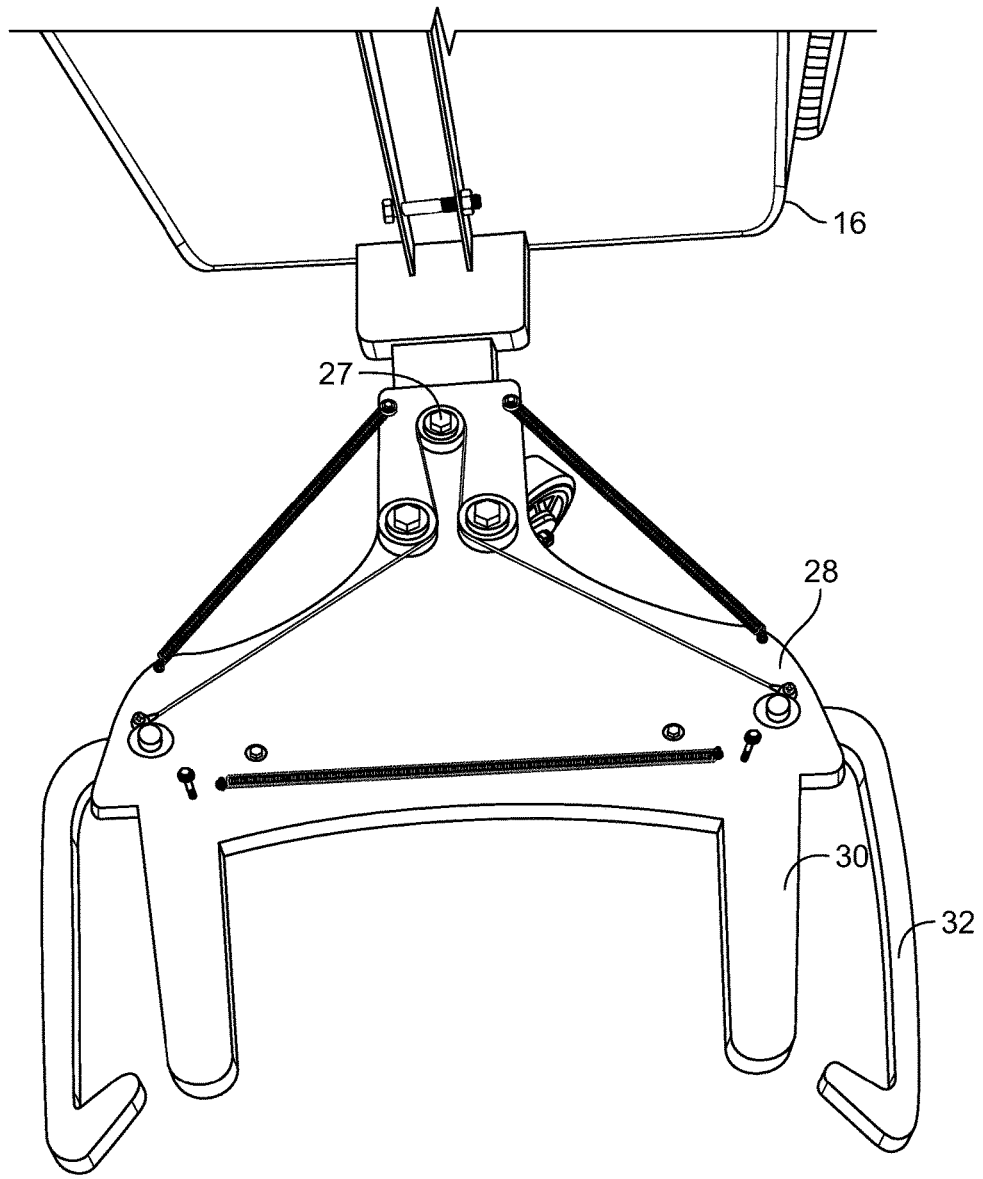
FIG. 15 is a top view of the engagement area of a grasping apparatus made in accordance to the current disclosure.
Figure 16:
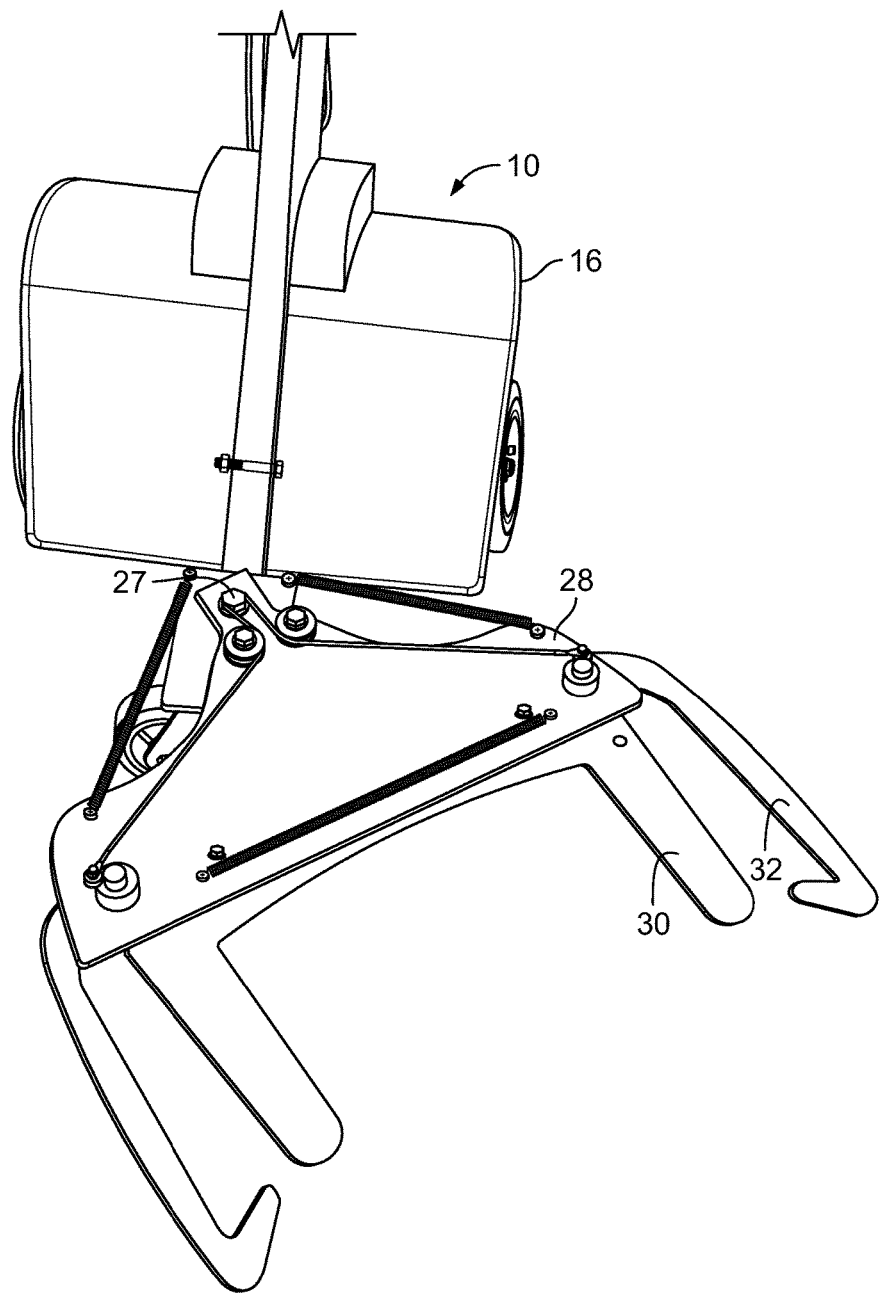
FIG. 16 is a top view similar to FIG. 15.
Figure 17:
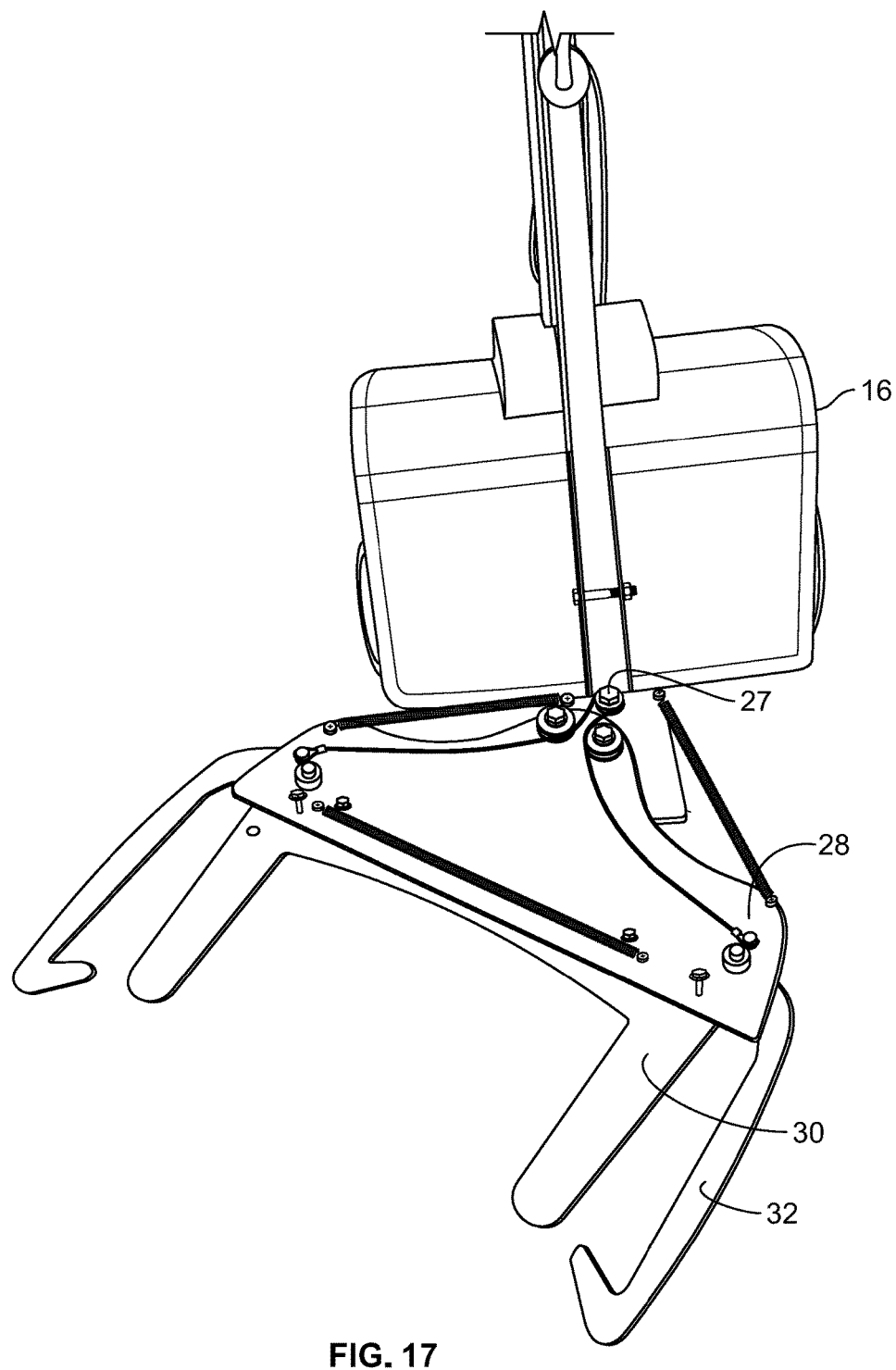
FIG. 17 is a top view similar to FIGS. 15 and 16.
Figure 18:
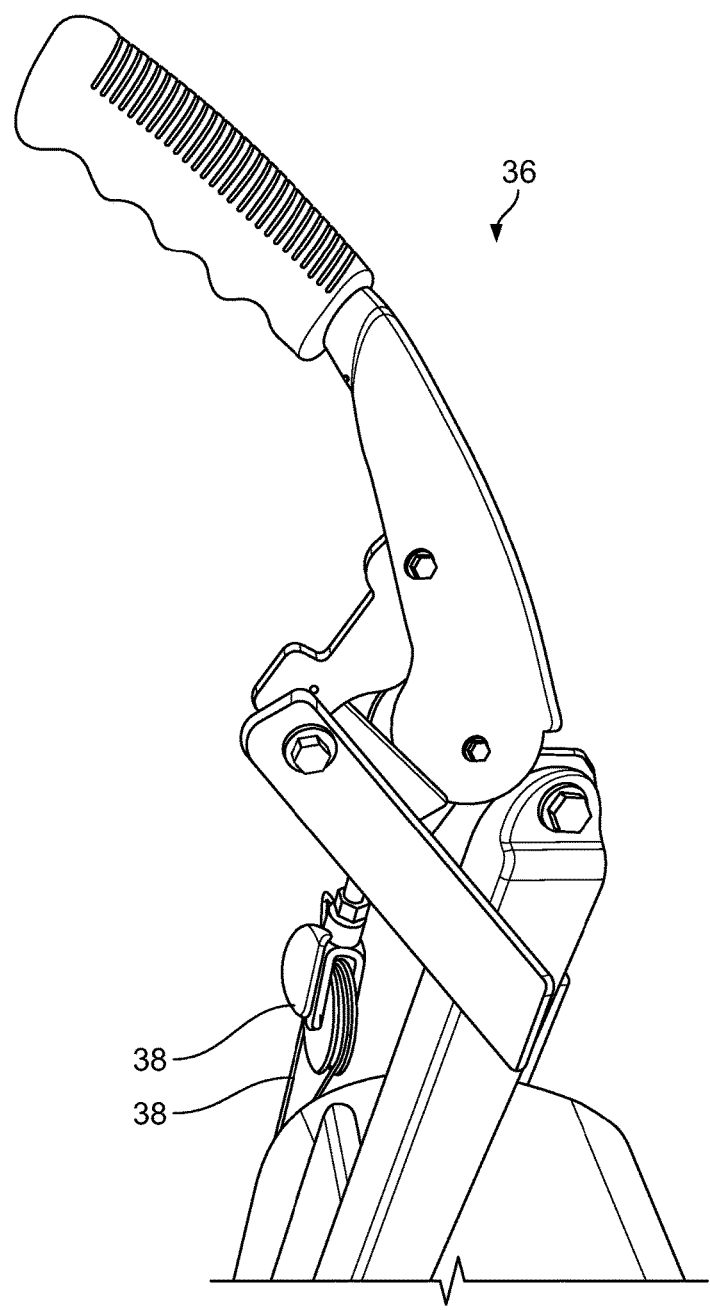
FIG. 18 is a detailed view of the controls for a grasping apparatus made in accordance with the current disclosure.
Figure 19:
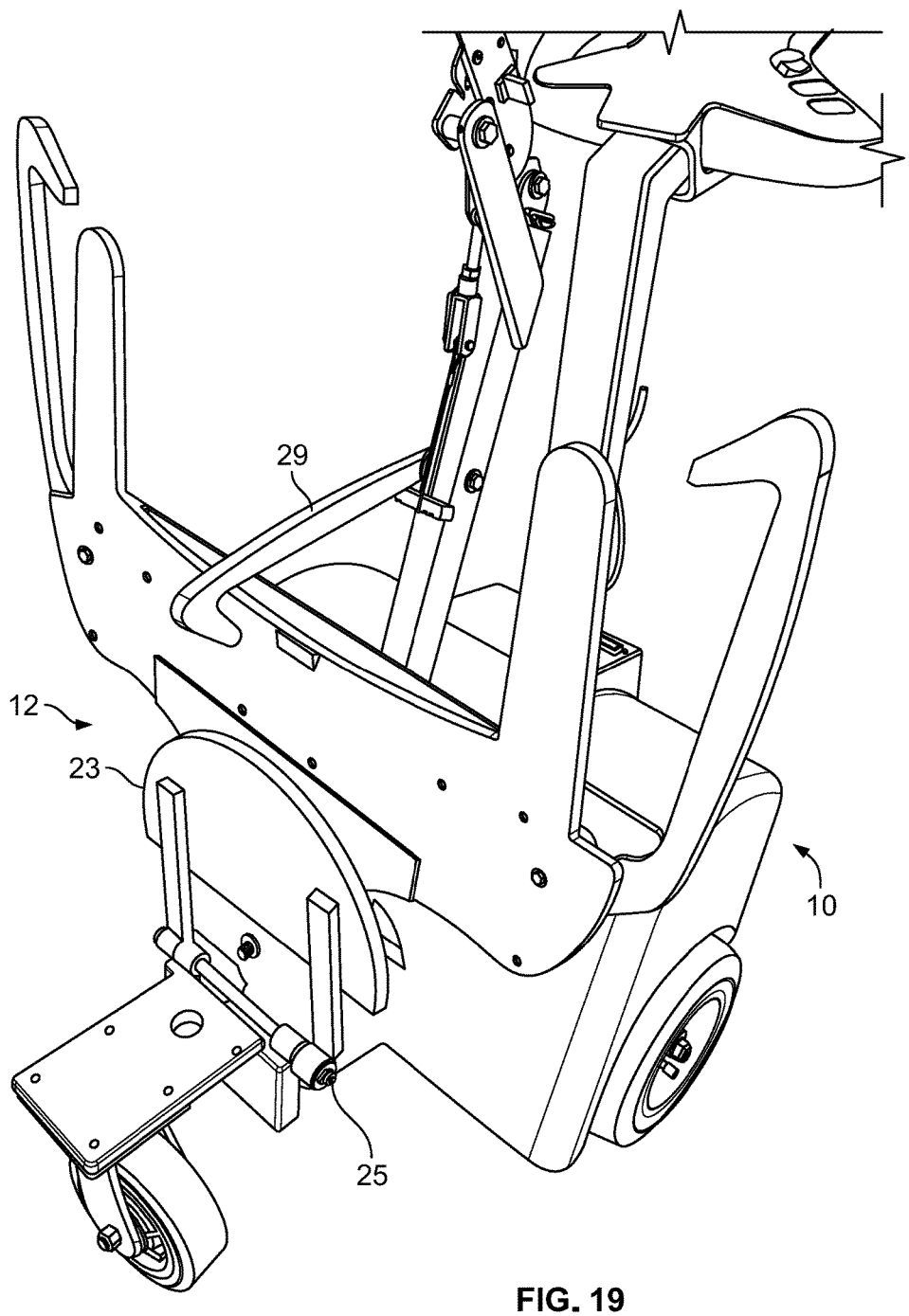
FIG. 19 is a front perspective view of a grasping apparatus and transfer device made in accordance to the current disclosure, with the engagement area of the grasping device shown in a raised position.
Figure 20:
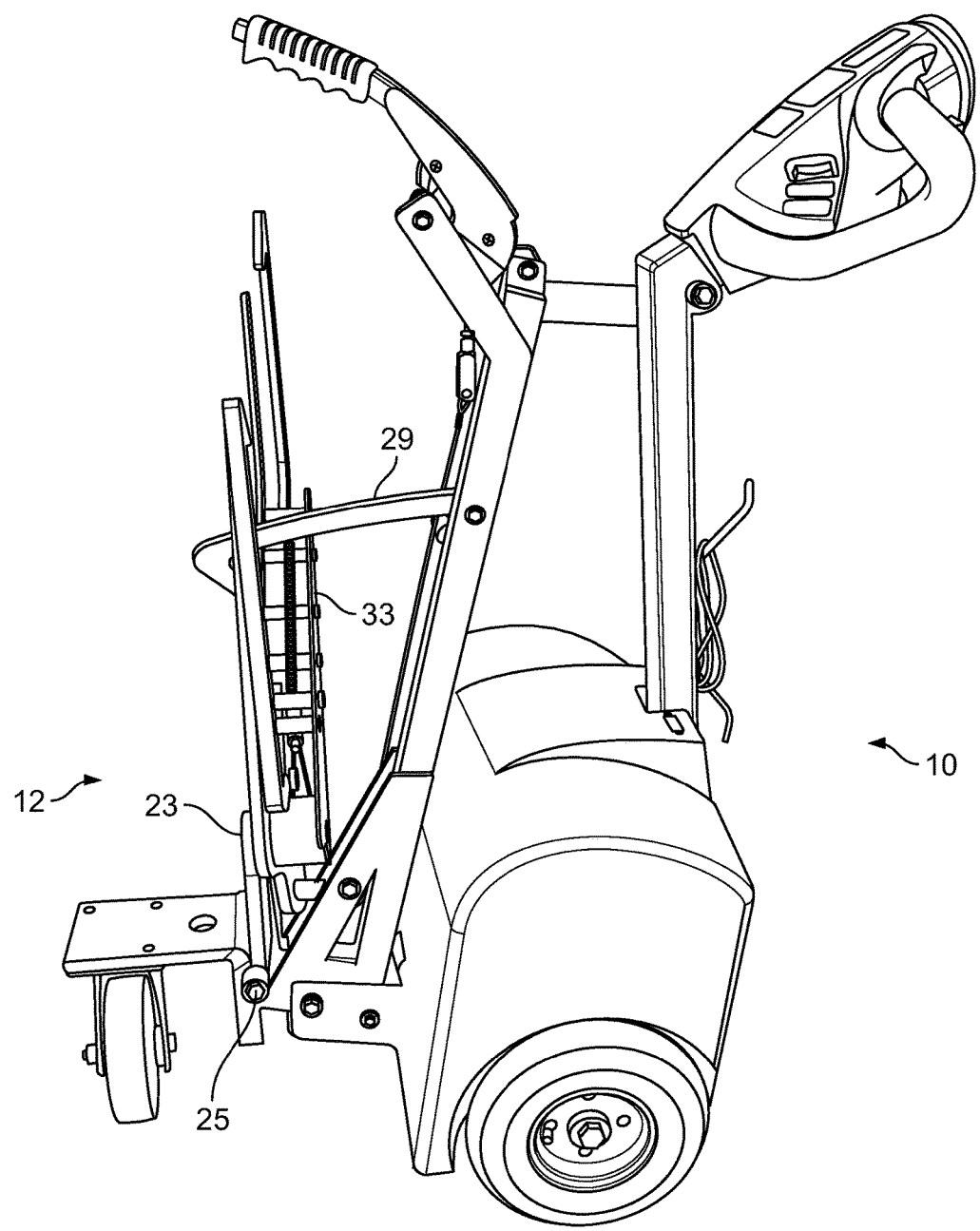
FIG. 20 is a side perspective view of a grasping apparatus and transfer device shown in FIG. 19.
Figure 21:
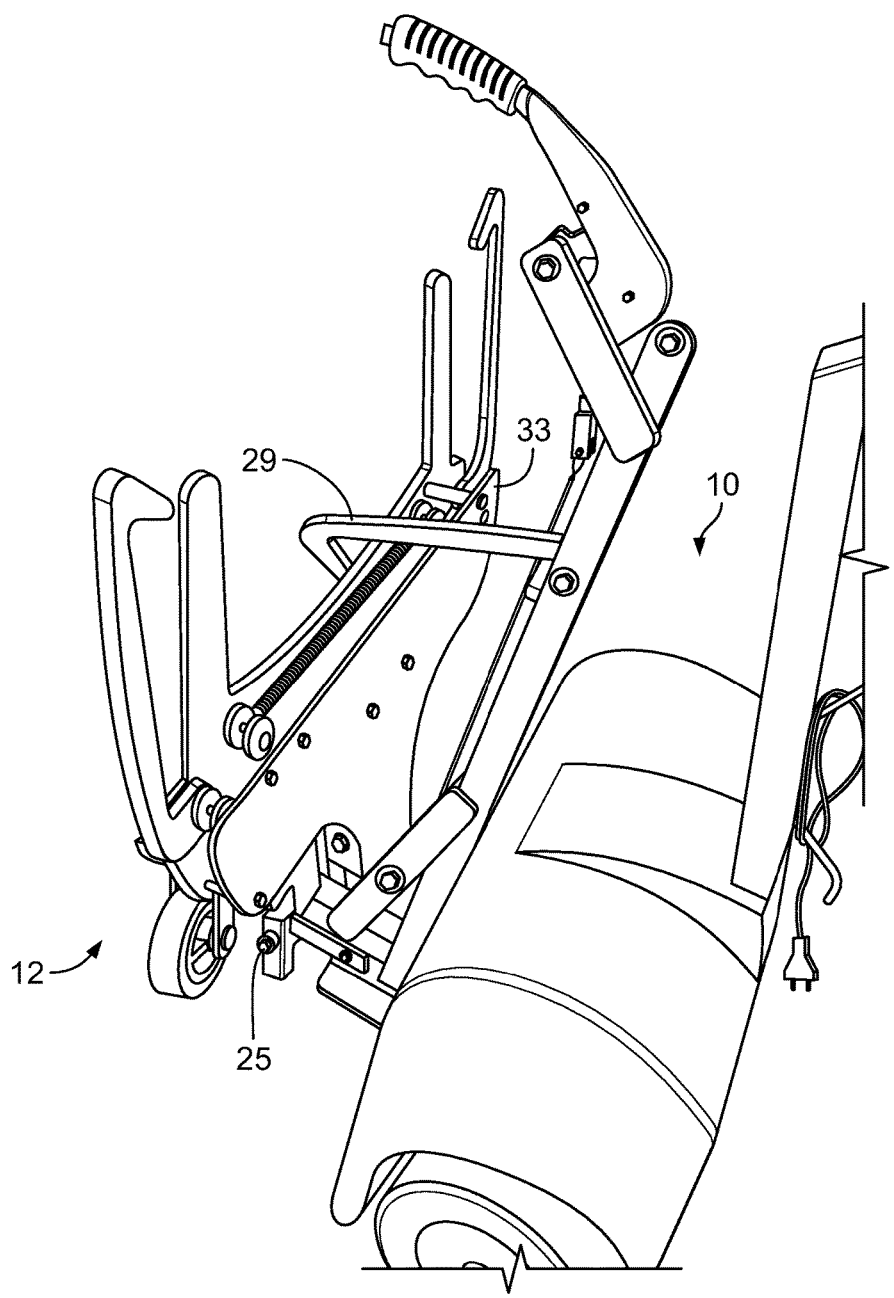
FIG. 21 is a back side perspective view of a grasping apparatus and transfer device shown in FIG. 19.
Figure 22:
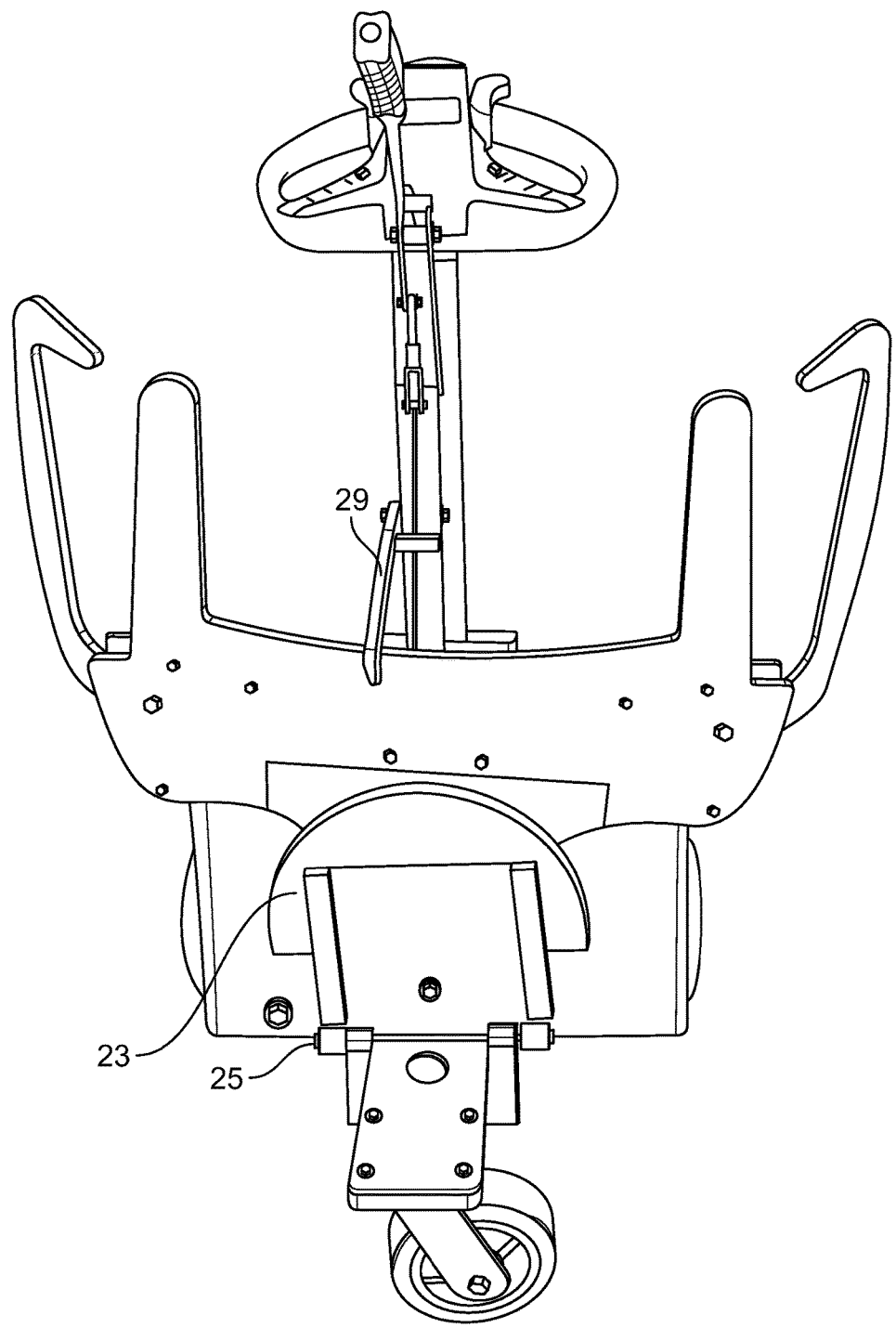
FIG. 22 is a front perspective view of a grasping apparatus and transfer device shown in FIG. 19.
Figure 23:
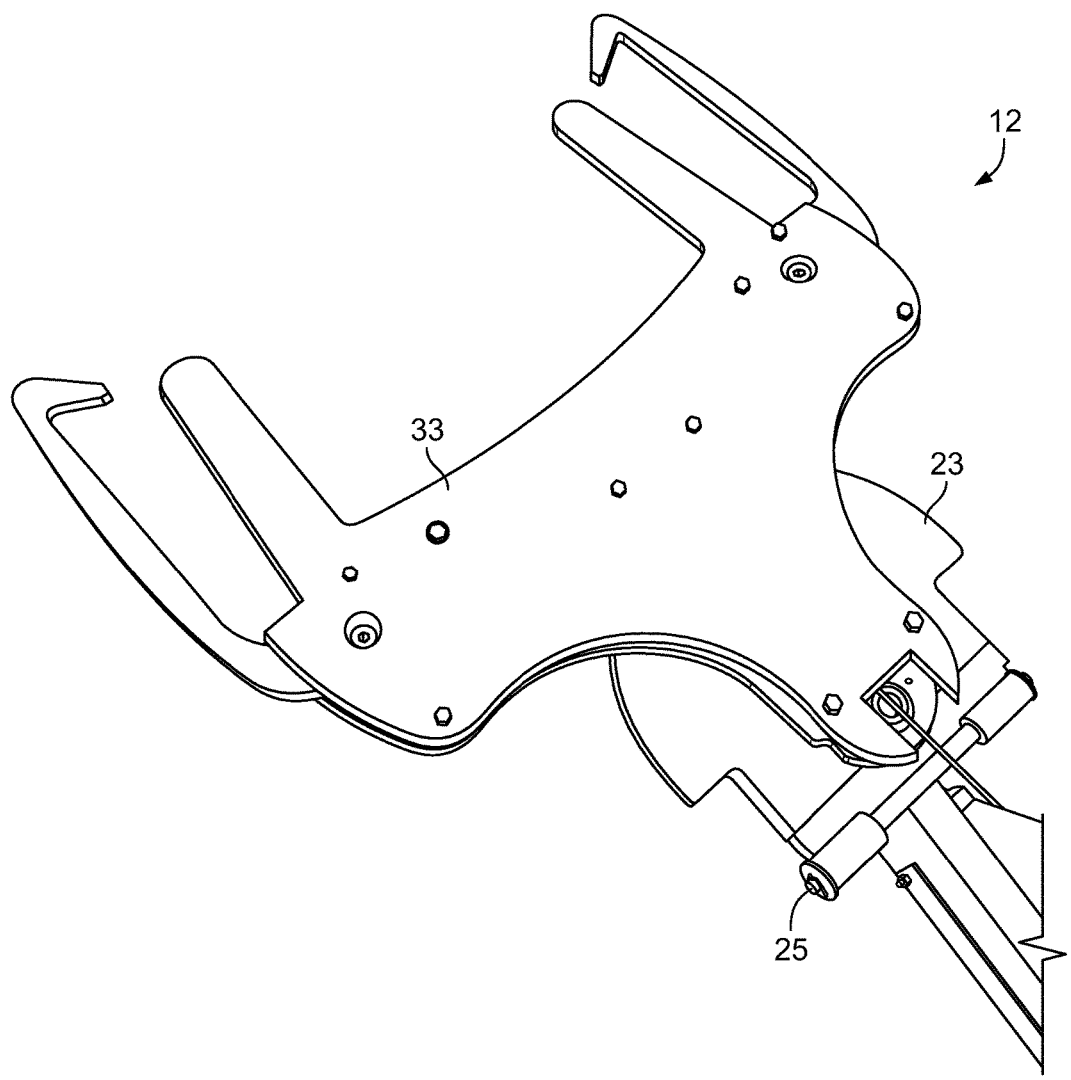
FIG. 23 is a top perspective view of the engagement area of a grasping apparatus made in accordance to the current disclosure.
Figure 24:
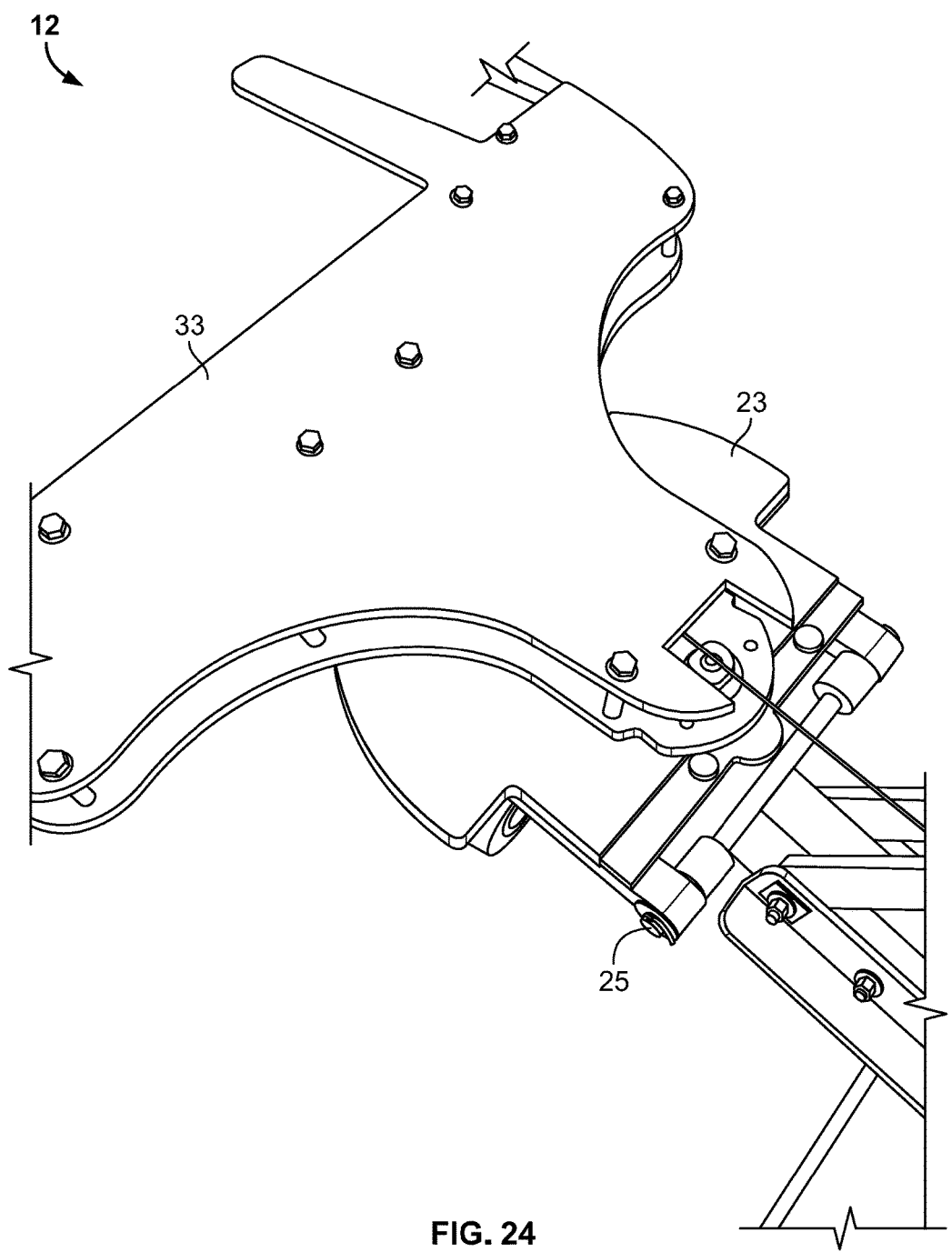
FIG. 24 is detailed view of the engagement area of FIG. 23.
Figure 25:
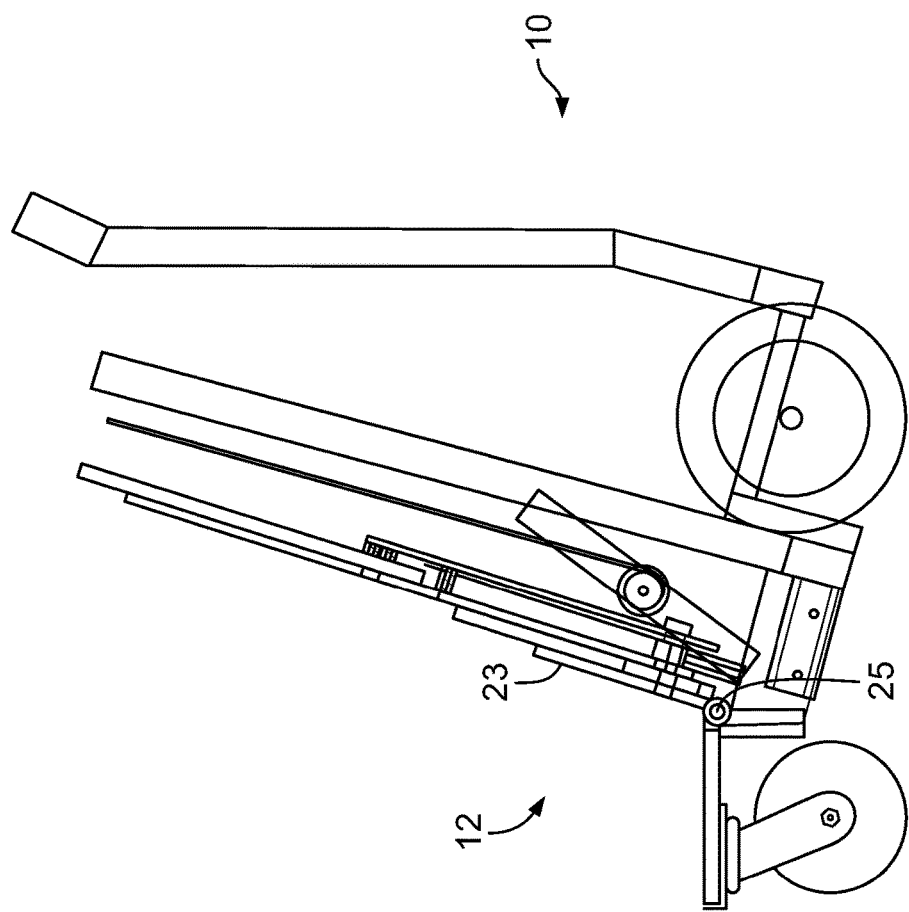
FIG. 25 is a schematic of a grasping apparatus and transfer device made in accordance to the current disclosure with the engagement area of the grasping device shown in a raised position.
Figure 26:
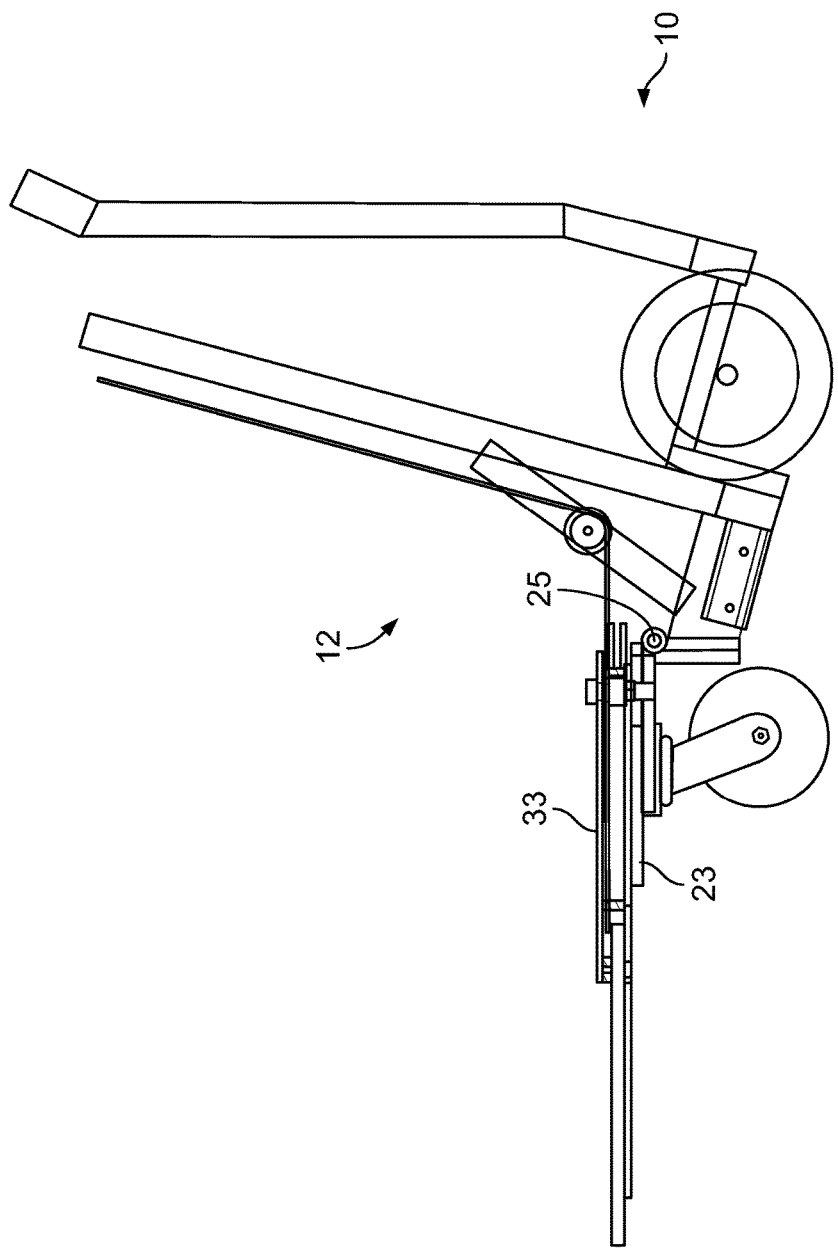
FIG. 26 is a schematic of a grasping apparatus and transfer device made in accordance to the current disclosure with the engagement area of the grasping device shown in a lowered position.
Figure 27:
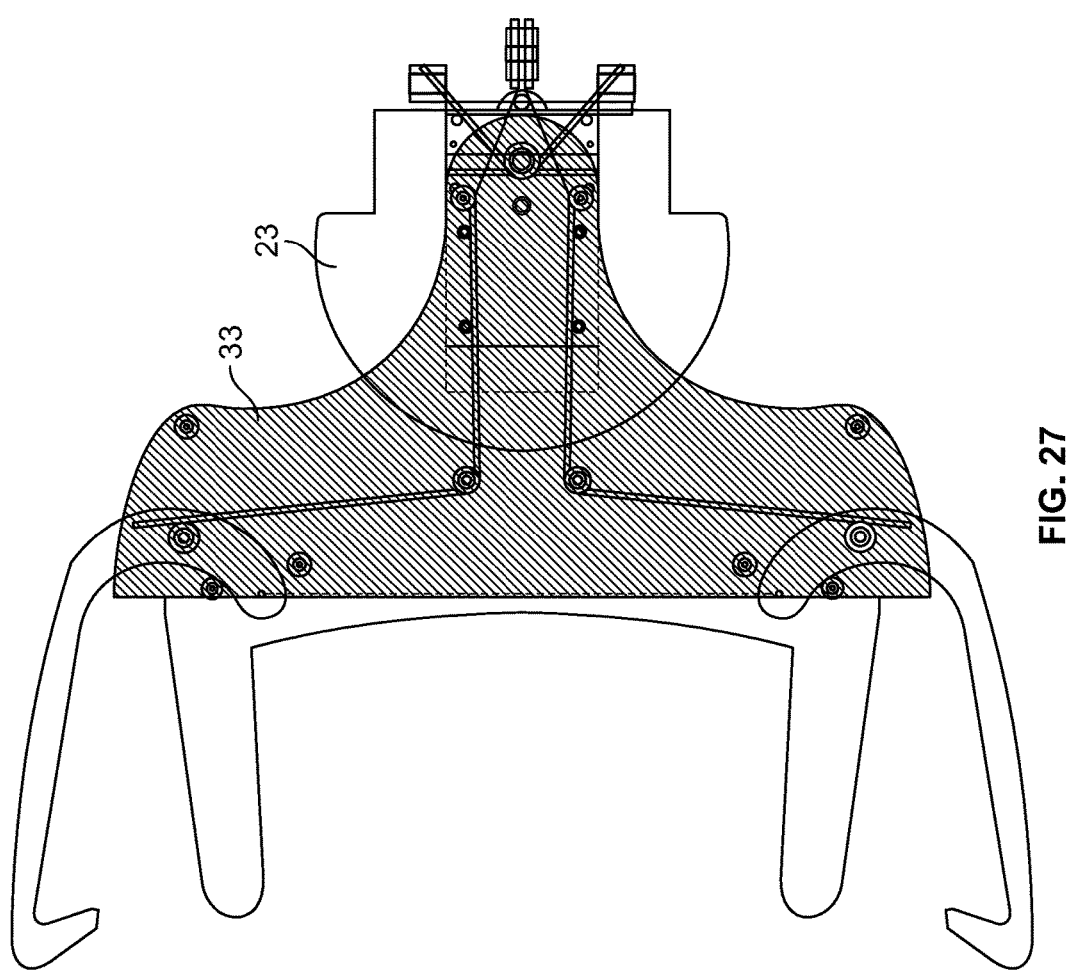
FIG. 27 is detailed schematic of the engagement area of FIG. 25-26.
Figure 28:
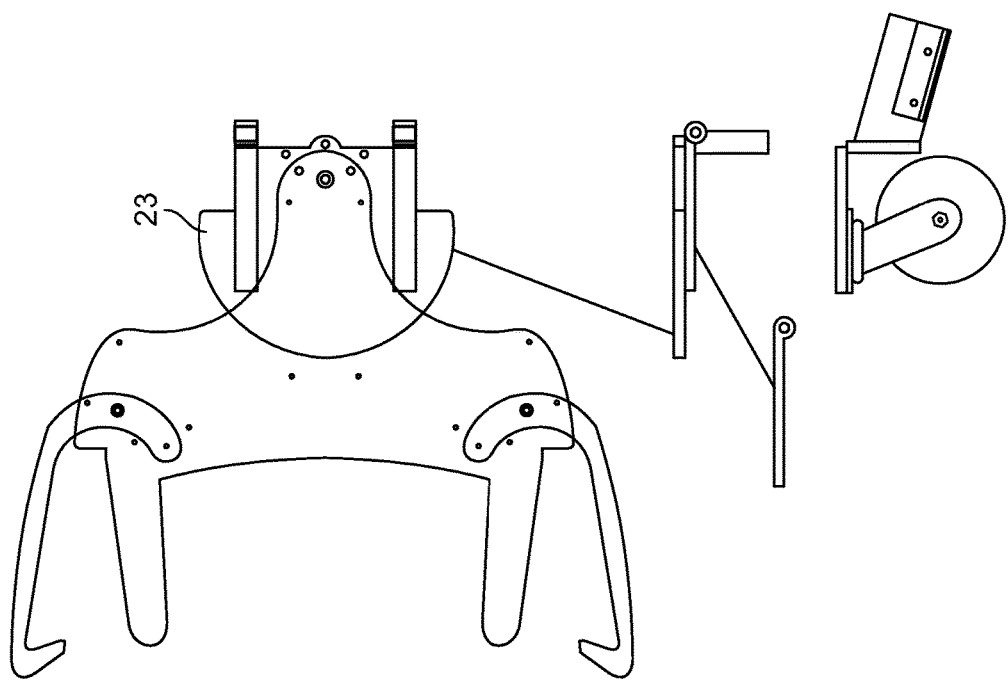
FIG. 28 is detailed schematic of the engagement area of FIG. 25-26.
Figure 29:
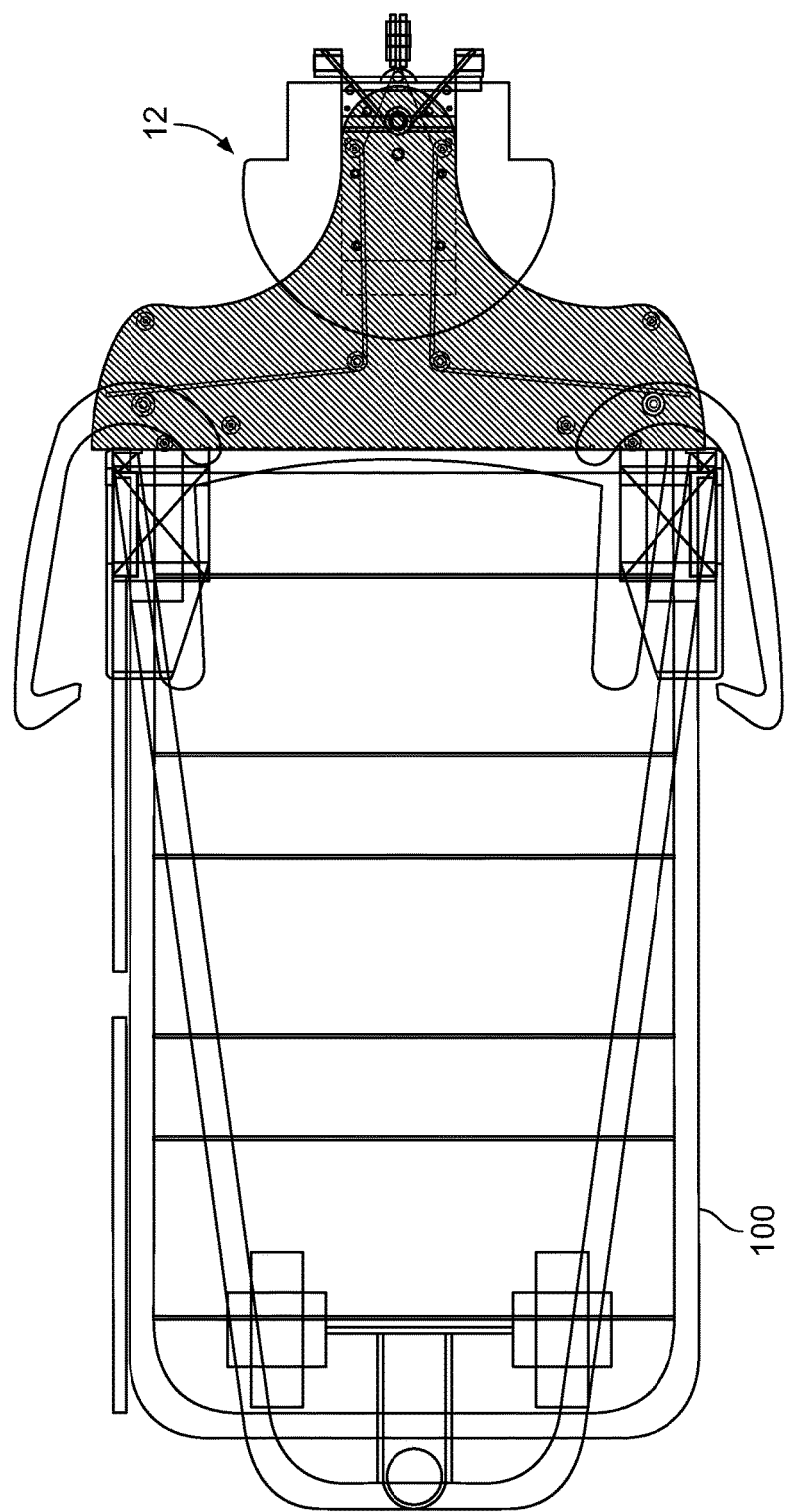
FIG. 29 is detailed schematic of the engagement area of FIG. 25-26 engaging a portion of a rolling rack.

Referring now generally to FIGS. 15-17, the axis 27 about which the bracket 28 rotates is illustrated. FIG. 15 has the biasing members 42 positioning the bracket 28 in a center, or neutral position. FIGS. 16 and 17 show the rotation of bracket 28 about that axis 27 and the associated tension in the biasing members 42 and the tendency to return the bracket 28 into the central or neutral position.

Figure 13:
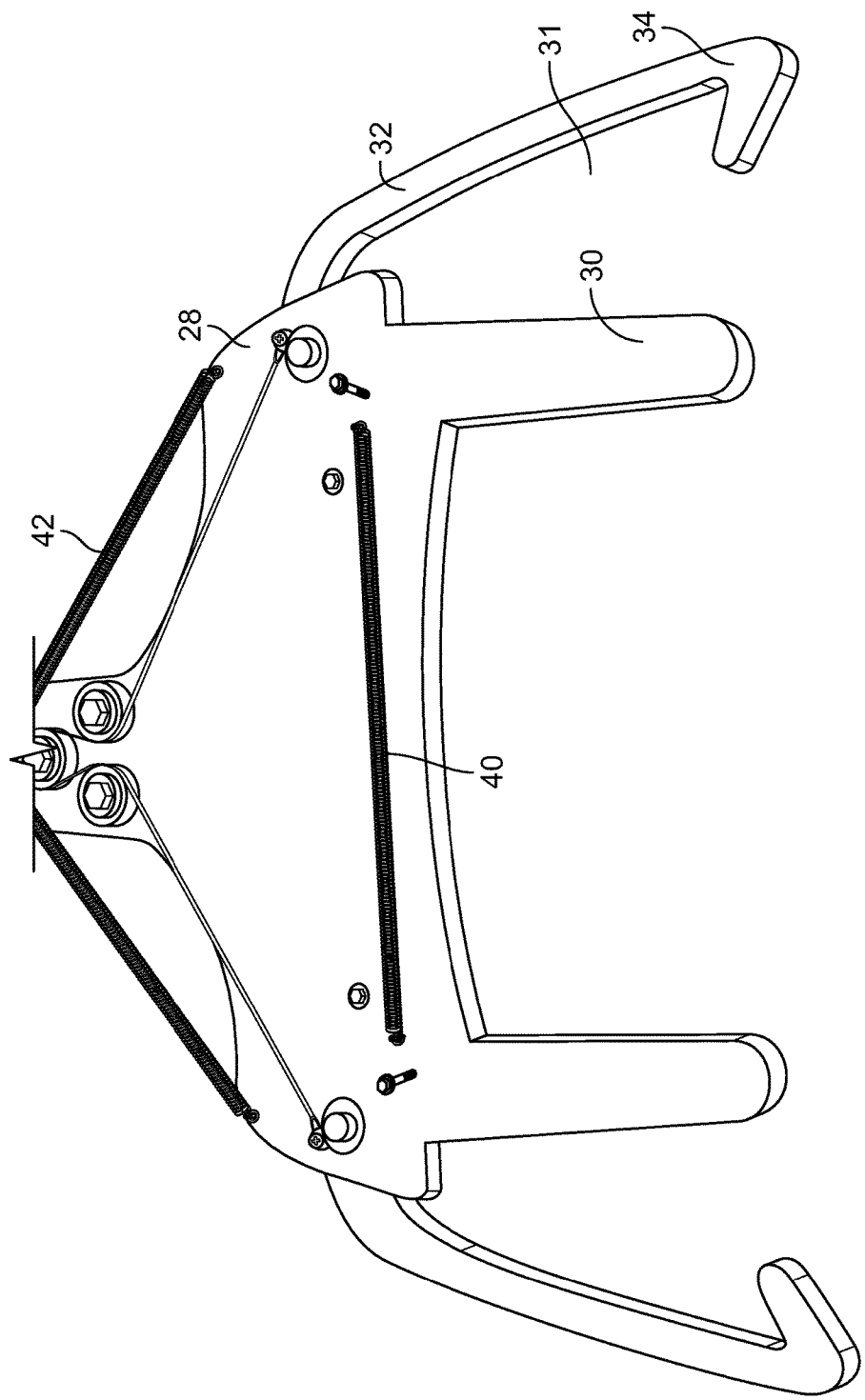
FIG. 13 is a detailed view of the engagement area shown with the armatures in an open position.
Figure 14:
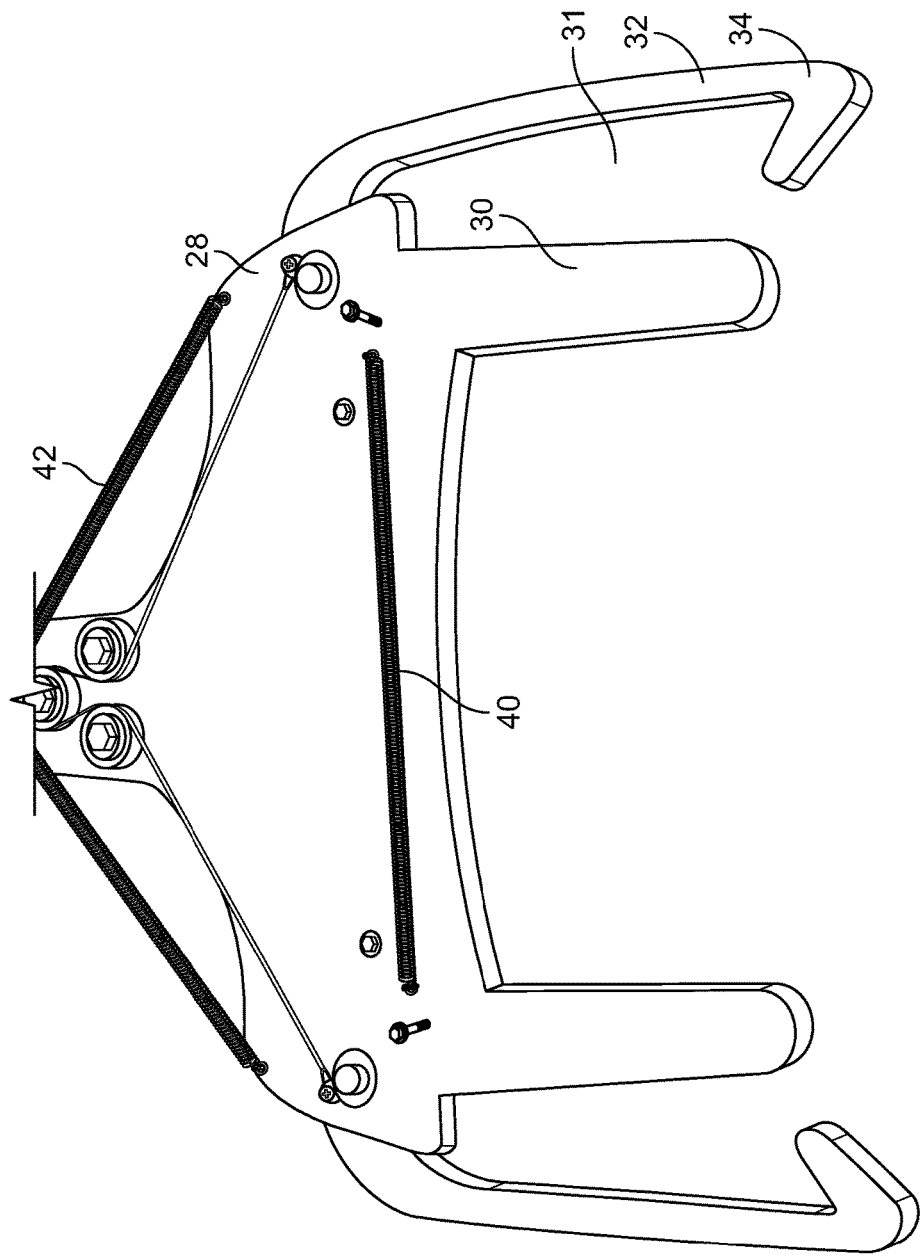
FIG. 14 is a detailed view similar to FIG. 13.

Looking now at FIGS. 13 and 14, the movement of the actuating arms 32 is illustrated. In FIG. 14, the actuating arms 32 are in a closed position such that the space 31 between actuating armature 32 and guide armatures 33 is reduced. This is the position where the armatures 30 and 32 engage a rolling rack 100. In FIG. 13 the actuating armatures 32 are shown in an open position where the space 31 between armatures 30 and 32 is greater. This is a position of disengagement of the bracket 28 from the rolling rack 100. The system can be designed such that the rolling rack 100 can be engaged when the actuating armatures 32 are in the closed position as seen in FIG. 14. This alignment depends on the tolerances within the connectors 38 and the biasing member 40. Alternately, the grasping apparatus 12 can be designed such that the actuating armature 32 will only engage the rolling rack 100 when in the open position as shown in FIG. 13.

Figure 2:
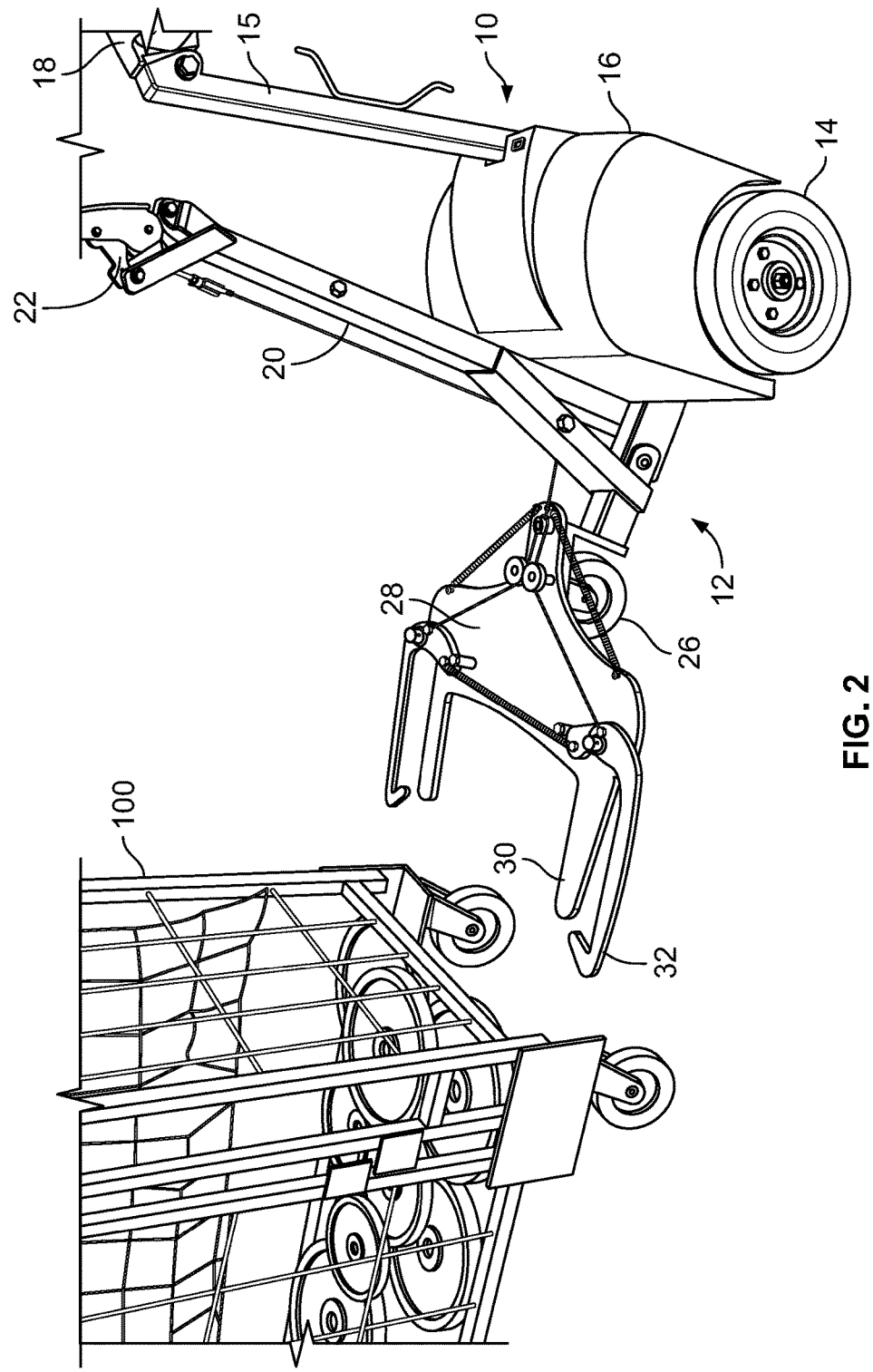
FIG. 2 is a perspective view similar to FIG. 1.
Figure 3:
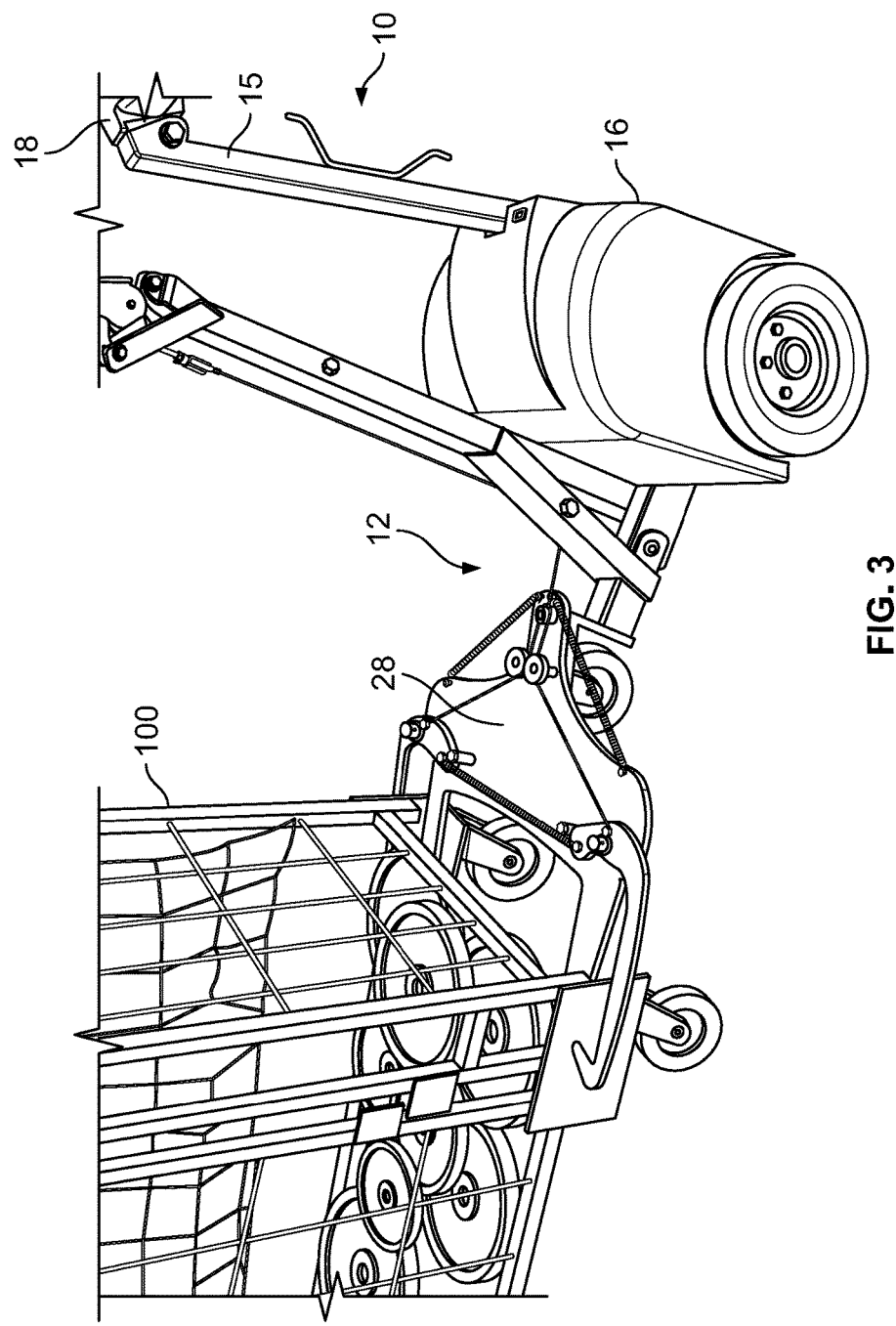
FIG. 3 is a perspective view similar to FIGS. 1 and 2.
Figure 4:
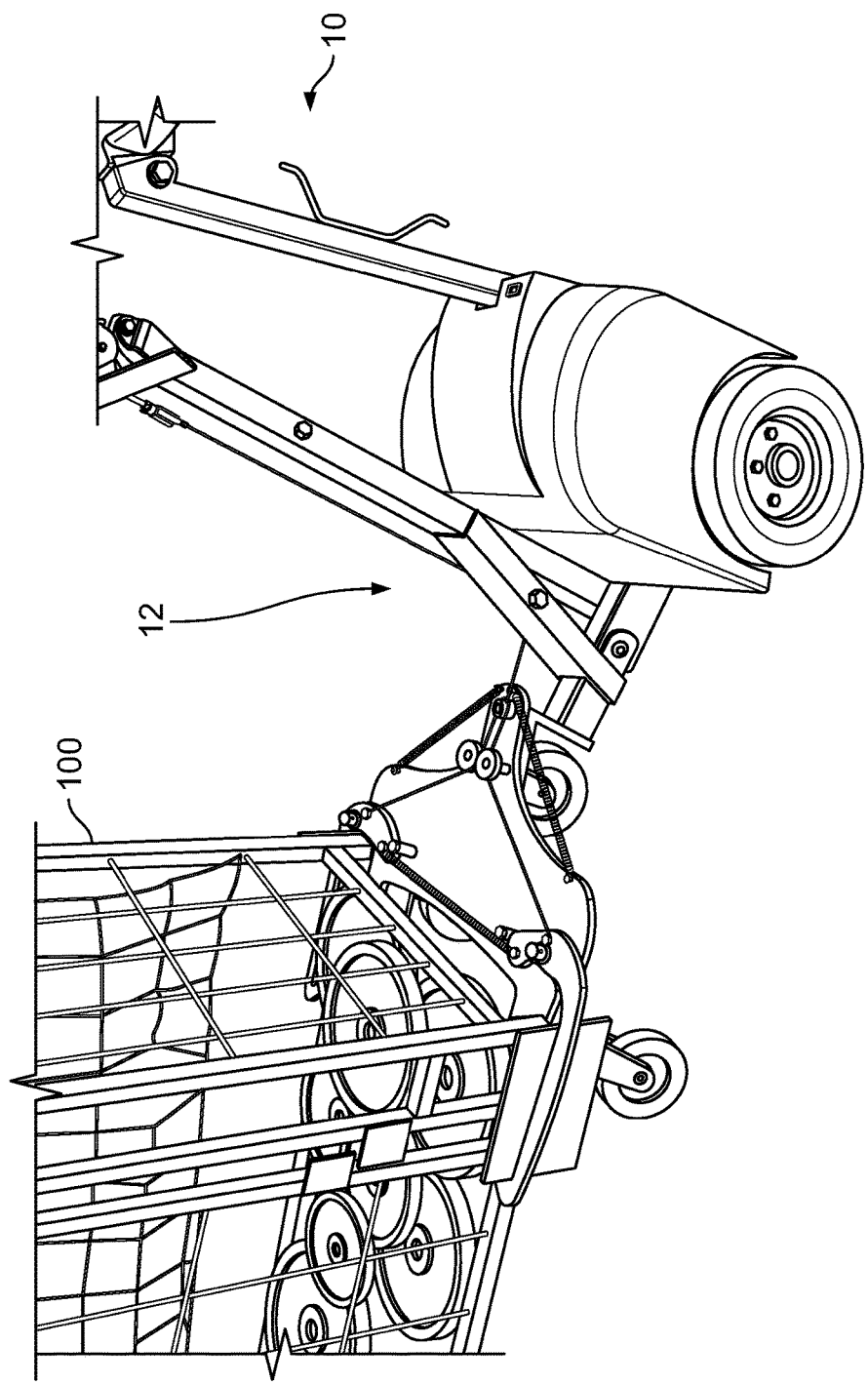
FIG. 4 is a perspective view similar to FIG. 3.
Figure 5:
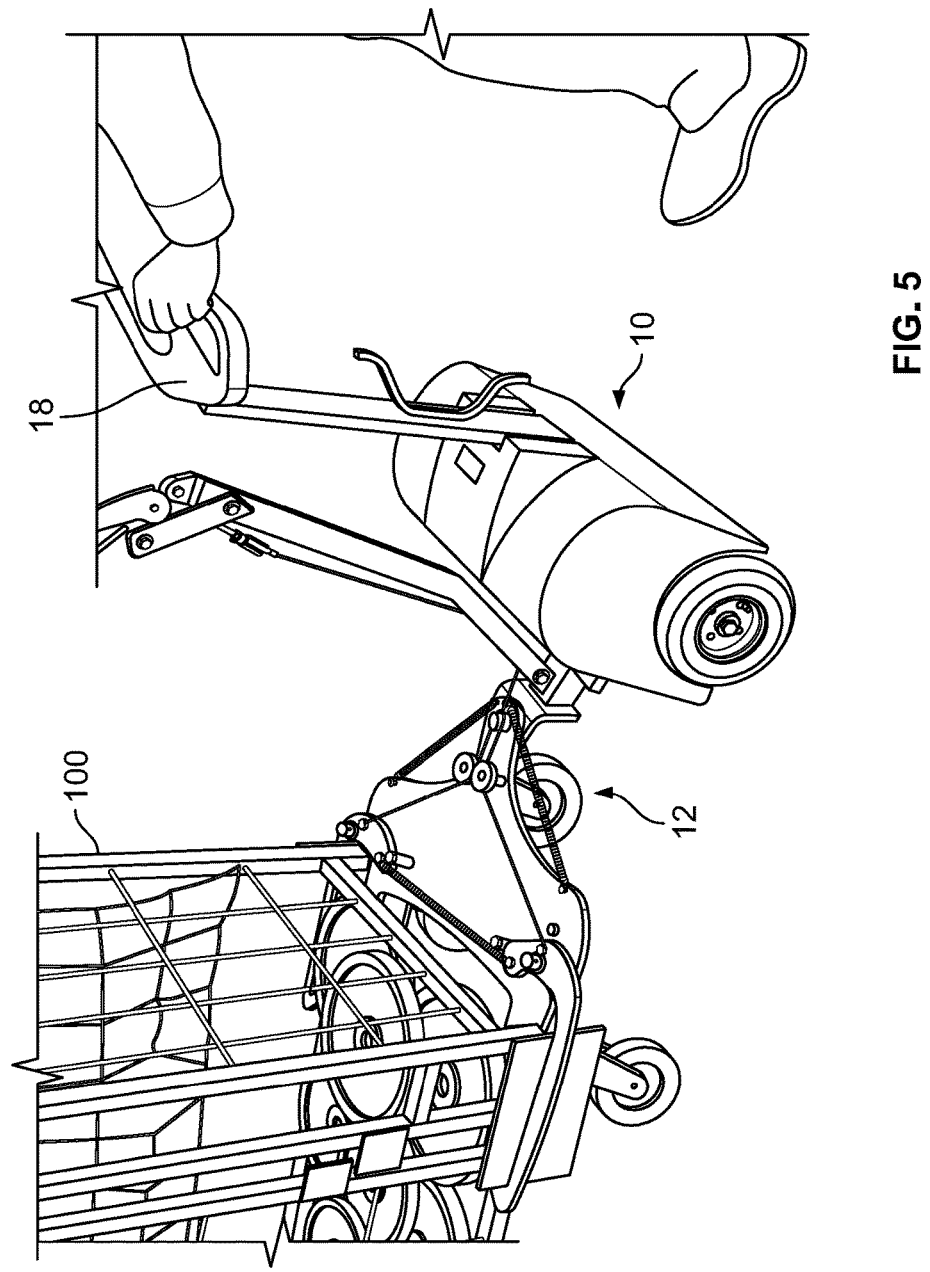
FIG. 5 is a perspective view similar to FIGS. 1-4.
Figure 6:
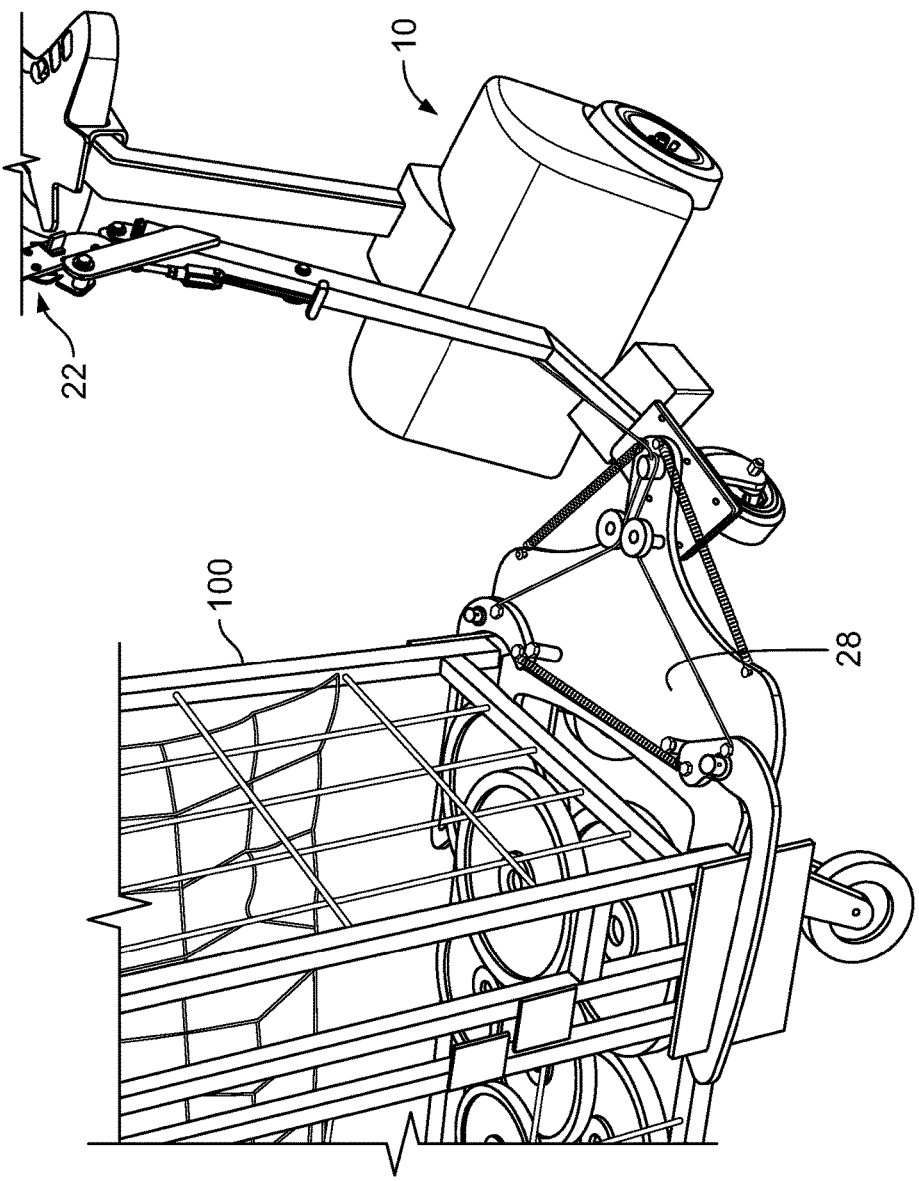
FIG. 6 is a perspective view similar to FIG. 5.
Figure 7:
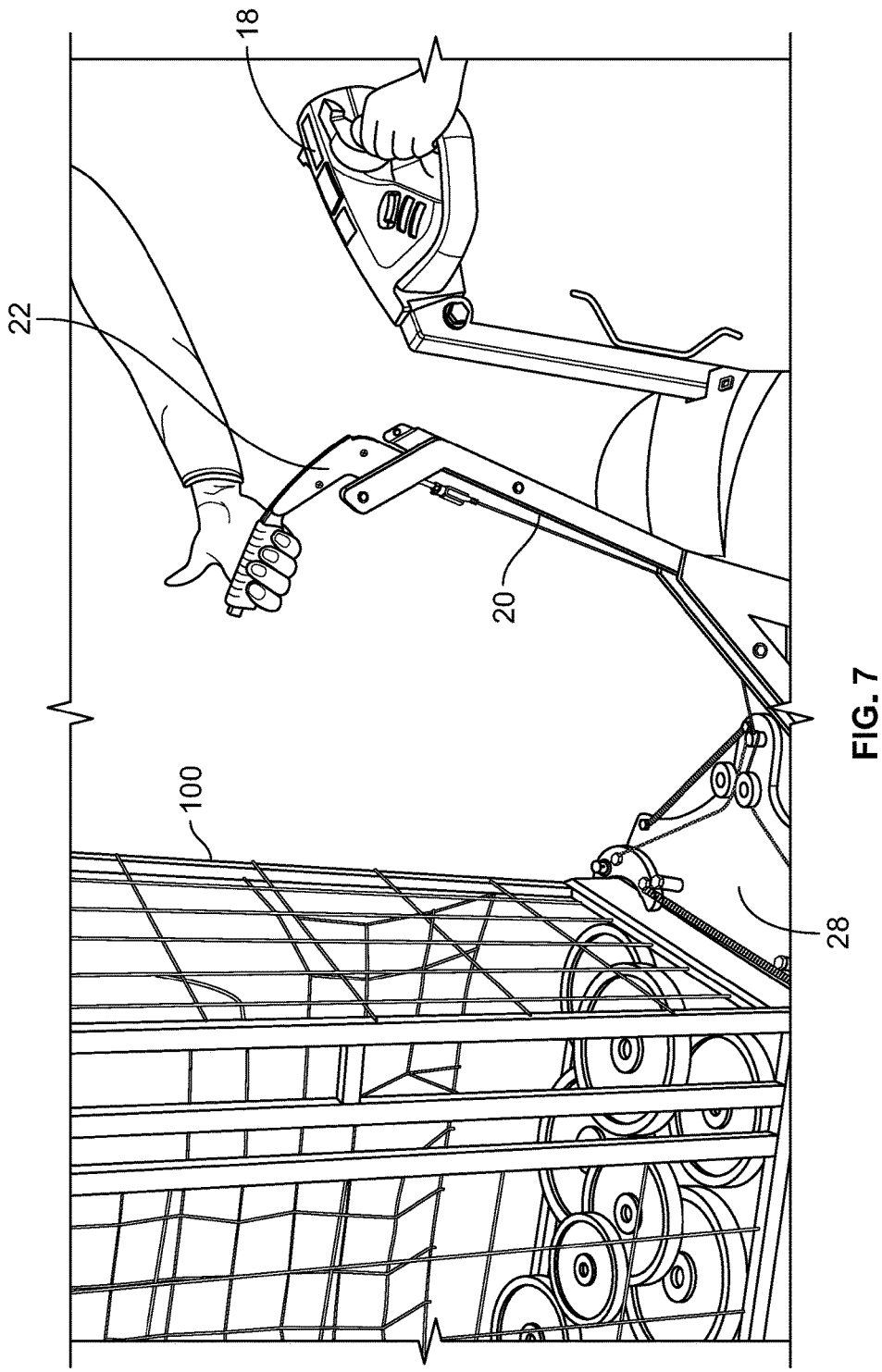
FIG. 7 shows a user engaging the controls to release the rolling rack from the grasping apparatus.
Figure 8:
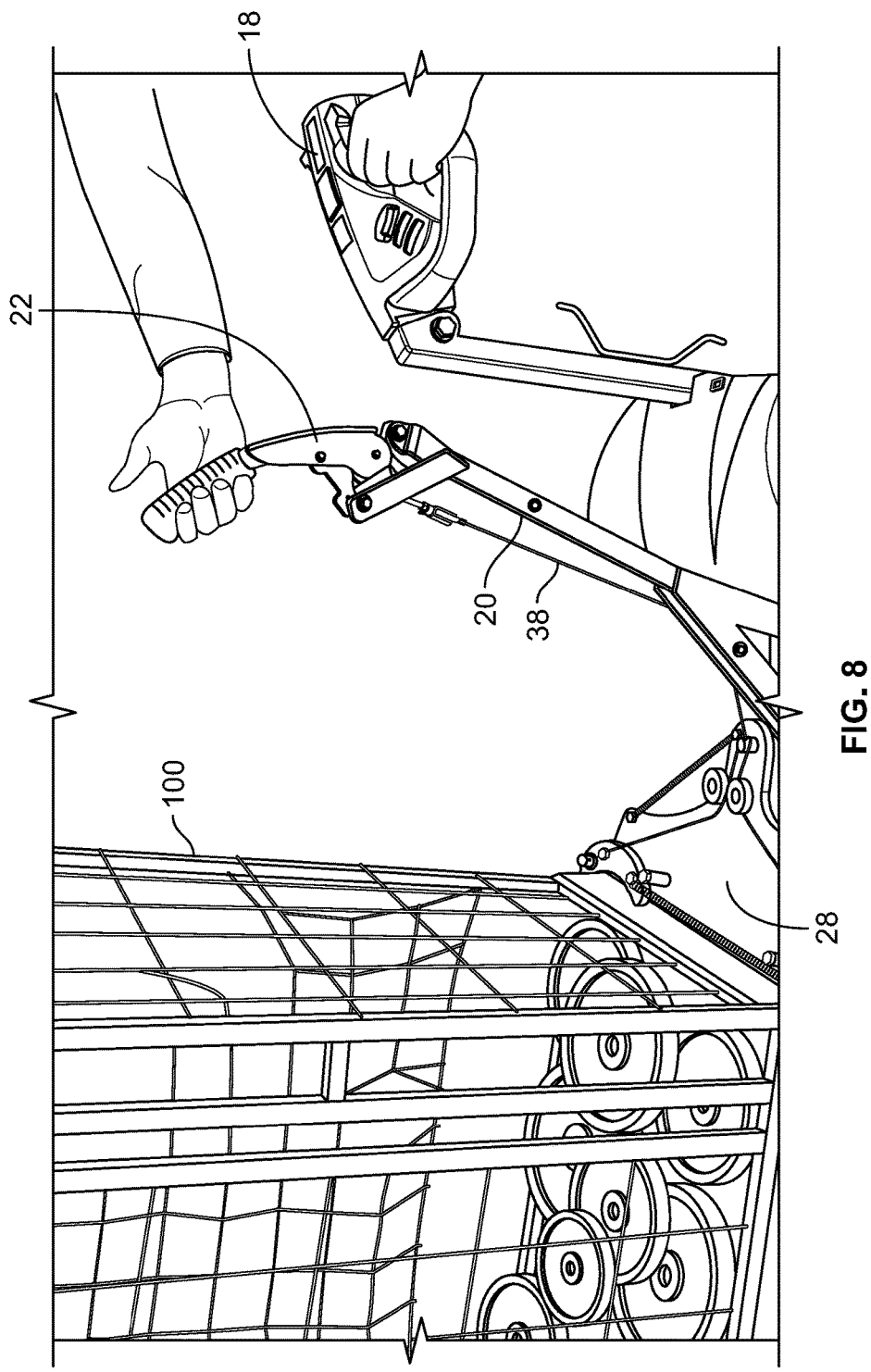
FIG. 8 is a perspective view similar to FIG. 7.
Figure 9:
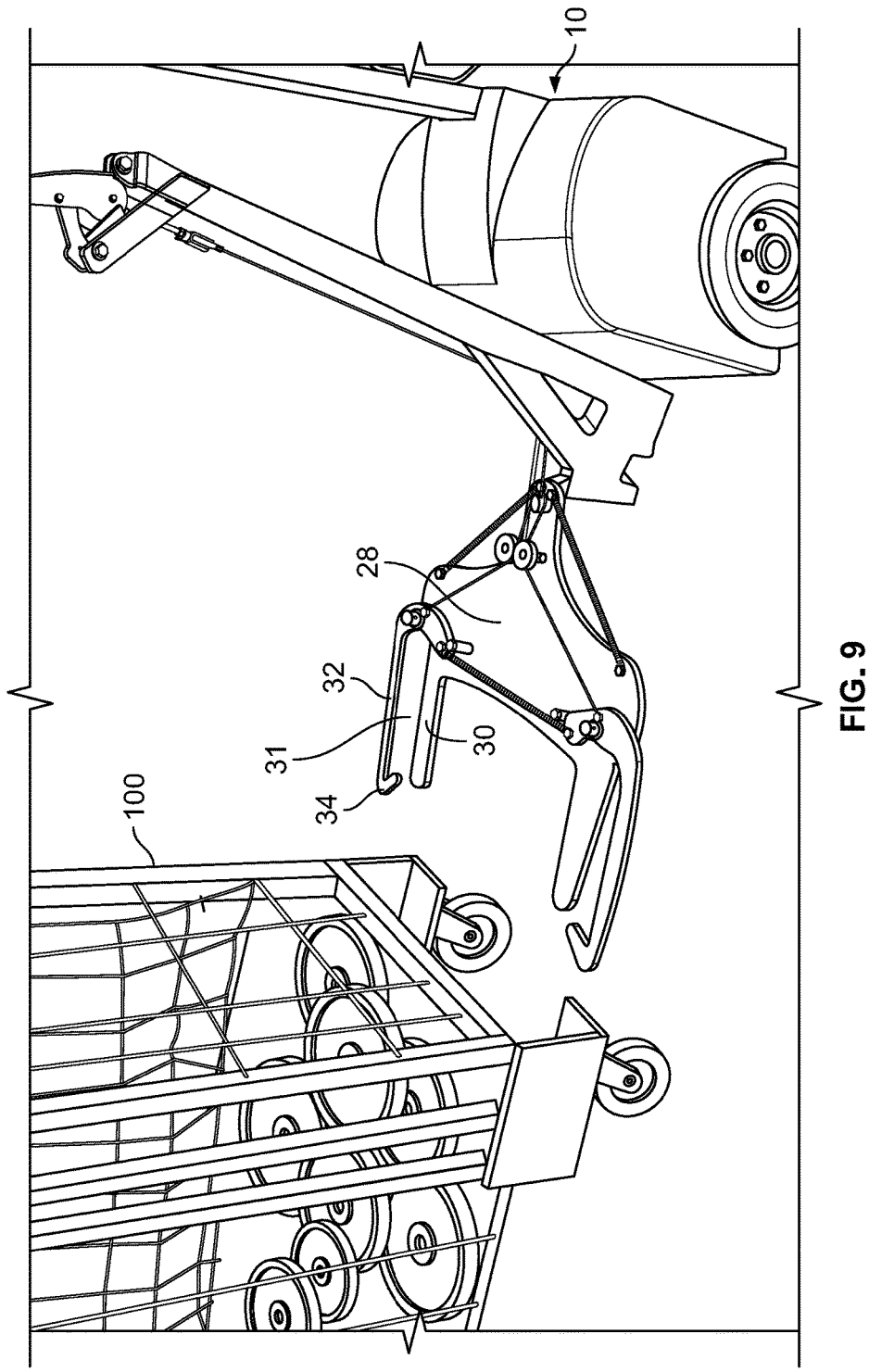
FIG. 9 is a perspective view showing the release and removal of the grasping device from the rolling rack.
Figure 10:
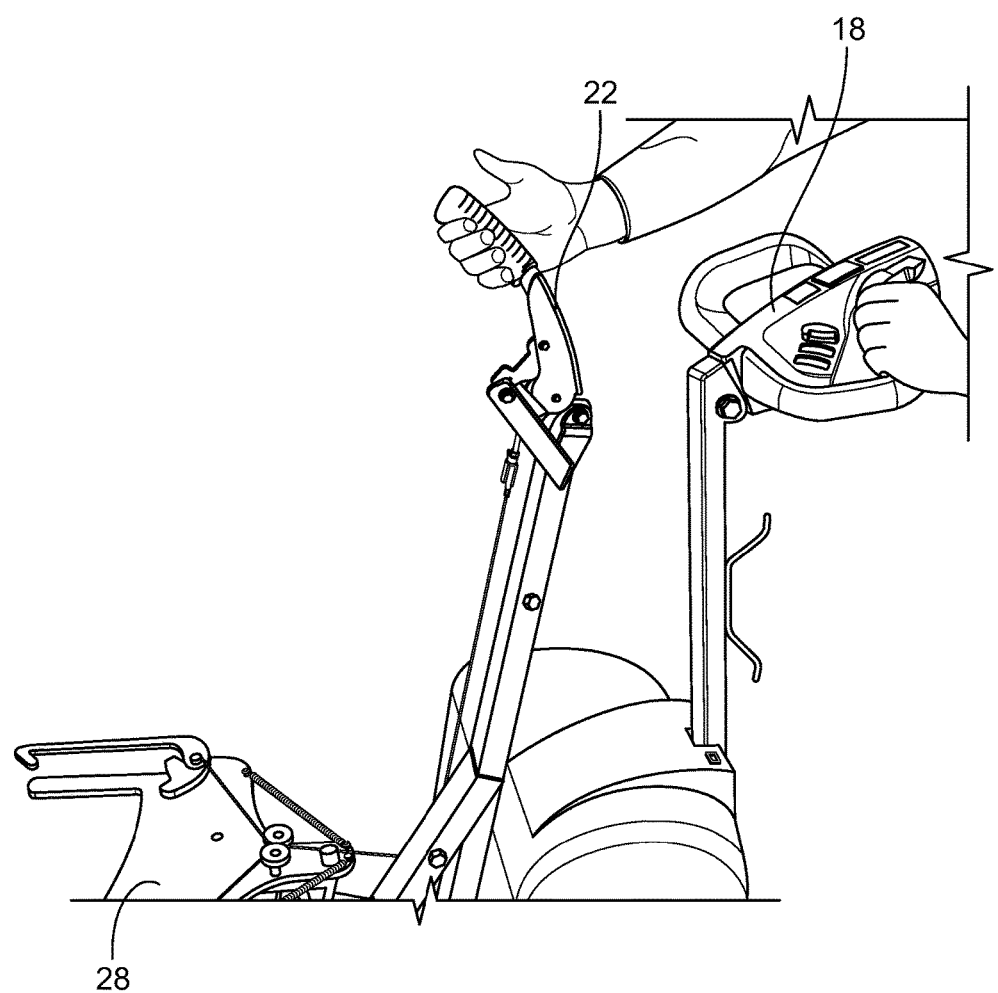
FIG. 10 is a perspective view showing a user engaging the controls to prepare the grasping device to engage another rolling rack.
Figure 11:
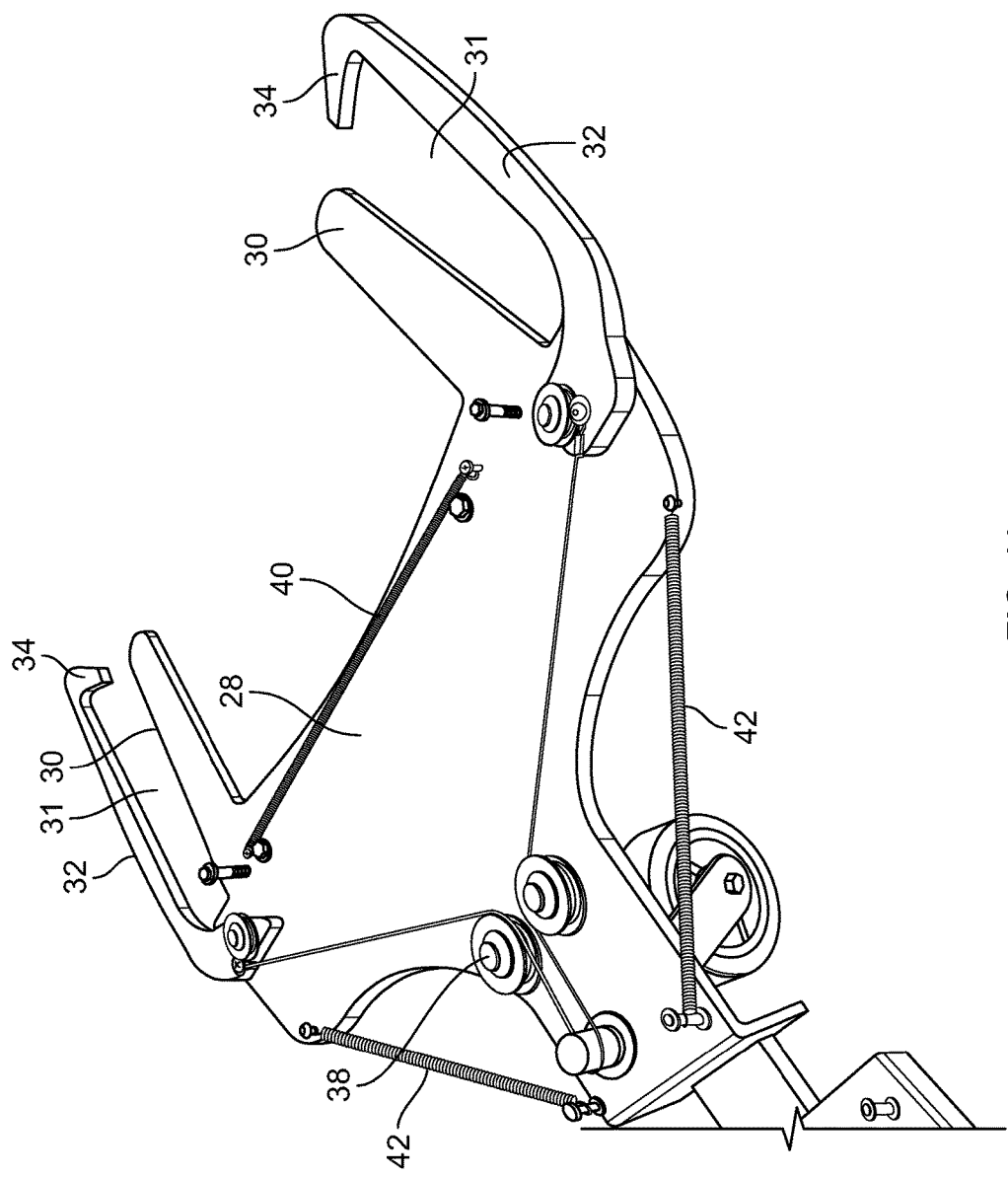
FIG. 11 is a top back perspective view of the engagement area of a grasping apparatus made in accordance to the current disclosure.
Figure 12:
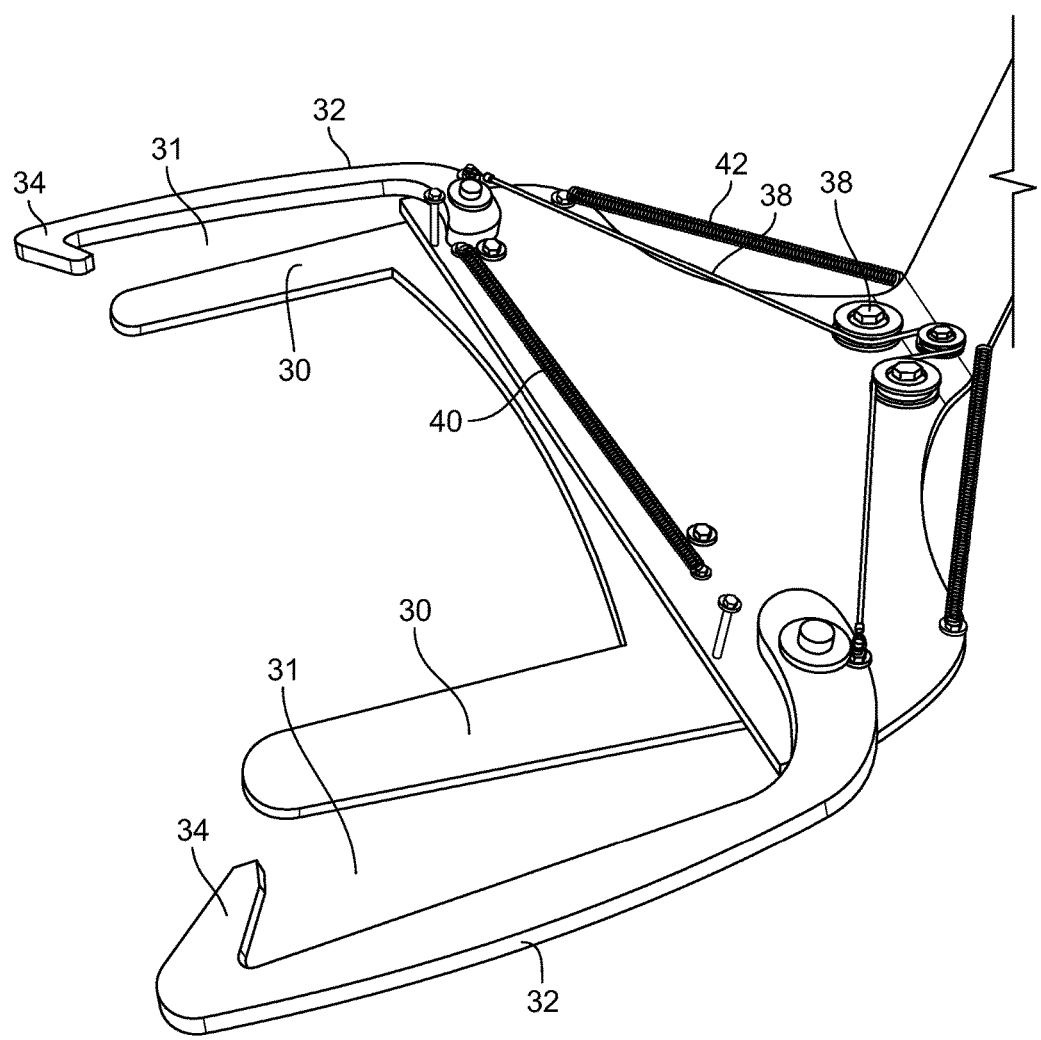
FIG. 12 is a front side perspective view of the engagement area of a grasping apparatus made in accordance to the current disclosure.

Now looking generally at FIGS. 1-10, operation of the transfer device 10 and grasping apparatus 12 is shown. FIG. 1 shows the approach of the transfer device 10 as it moves the grasping apparatus 12 towards a rolling rack 100. FIGS. 2 and 3 also show the approach of the bracket 28 to the rolling rack 100 and the beginning of the engagement of the rolling rack 100 to the bracket 28 and more specifically to the guide armatures 30 and actuating armatures 32. FIG. 4 shows the full engagement of the rolling rack 100 within the armatures 30 and 32 of the bracket 28. A portion of the rolling rack 100 is within the space 31 and the engagement ends 34 are secured around that portion of the rolling rack 100. FIGS. 5 and 6 show movement of the transfer device as initiated by a user providing this movement, which in turn moves the grasping apparatus 12, which in turn moves the rolling rack 100 engaged in the bracket 28 between the armatures 30 and 32. FIG. 7 shows a user grasping the actuating device 36 as it begins to move the actuating armatures 32 from a closed position. FIG. 8 shows the actuating device 36 moved and the corresponding movement of the actuating armatures 32 to an open position as shown in FIG. 9. From this open position, the user can disengage the grasping apparatus 12 from the rolling rack 100 and if so choose move the actuating device 36 back to the closed position as shown in FIG. 10.

The present disclosure provides a method of securing rolling racks for movement. The method includes positioning a grasping apparatus 12 to engage a rolling rack 100 and moving the grasping apparatus 12 by a transfer device 10 into engagement with the rolling rack 100. A method further includes transporting the rolling rack 100 to a desired location and activating the actuating device 36 to release the grasping apparatus 12 from the rolling rack 100. The method includes movement of the transfer device 10 and grasping apparatus 12 away from the rolling rack 100.

Now looking generally at FIGS. 19-30, the grasping apparatus 12 can have an alternate configuration. In this configuration, the grasping apparatus 12 can be movable from a raised, or up position, to a down, or engaging position. This movement allow for additional storage and movement options for the transfer device 10 and grasping apparatus 12 when not engaging the rolling rack 100. Preferable at least the engagement area 24, including the extension 28, guide armatures 30, and actuating armatures 32, can move between these positions. These elements can rotate about axis 25 positioned proximate to wheel 26. In this configuration, a support 23, such as a support plate 23, can engage the engagement area 24 to facilitate movement between the raised and down positions.

In this configuration, the connectors 38 can still be controlled by the handle 36 to actuate the actuating armatures 32 to engage the rolling rack 100. This configuration can include a latching device 29 that is positioned to engage the engagement area 24 when the engagement area 24 is in the up position. The latching device 29 can various design, such as an armature, and can itself be movable from an engaged position, such as a down position, and a released position, such as an up position. Additional some of the biasing elements, such as the biasing elements 42 can be eliminated. Further, a cover 33 can be added.

Thus, it is seen that the apparatus and methods disclosed herein achieve the ends and advantages previously mentioned. Numerous changes in the arrangement and construction of the parts and steps will be readily apparent to those skilled in the art, and are encompassed within the scope and spirit of the present disclosure. Further, the particular embodiments previously described are not intended to be construed as limitations upon the scope of this disclosure.

What is claimed is:

1. A grasping apparatus for transporting one or more rolling racks using a transport device, the grasping apparatus comprising:

a frame shaped to attach to the transport device;

an engagement area configured to rotate about an axis between an up position toward the frame and a down position spaced further from the frame, the engagement area attached to the frame and including an extension plate having at least one guide armature and at least one actuating armature, the armatures positioned to define a space sized to engage the rolling rack, the actuating armature positioned to selectively engage a portion of the rolling rack to secure the rolling rack for movement, wherein the actuating armature laterally extends beyond the extension plate; and controls attached to the frame, spaced from the engagement area and operatively connected to the at least one actuating armature, the controls facilitating selective movement of the at least one actuating armature.

2. The grasping apparatus of claim 1, wherein the engagement area further includes a support rotatively connected to the frame, the support connecting the at least one guide armature and the at least one actuating armature to the frame.

3. The grasping apparatus of claim 2, wherein the engagement area further includes a wheel attached to the support and positioned to facilitate movement of the support.

4. The grasping apparatus of claim 2, wherein the at least one guide armature and the at least one actuating armature are positioned on the support opposite from the frame.

5. The grasping apparatus of claim 2, wherein the support further includes at least one support biasing member, the support biasing member operatively connected to the frame and the support to facilitate movement of the support relative to the frame.

6. The grasping apparatus of claim 2, further including at least one grasping biasing member connected to the at least one actuating armature and operatively connected to the support, the least one grasping biasing member positioned to facilitate selective movement of the at least one actuating armature relative to the at least one guide armature.

7. The grasping apparatus of claim 1, further including at least two guide armatures and at least two actuating armatures, wherein each guide armature is positioned next to one of the actuating armatures to make a grasping pair.

8. The grasping apparatus of claim 7, wherein each grasping pair is spaced from the other grasping pair.

9. The grasping apparatus of claim 1, the controls further including an actuating device operatively connected to the at least one actuating armature to facilitate selective movement of the at least one actuating armature relative to the at least one guide armature.

10. The grasping apparatus of claim 9, further including connectors operatively engaging the actuating device and the at least one actuating armature, the connectors linking the controls and the at least one actuating armature.

* * * * *